United States Patent
Zhu et al.

(10) Patent No.: US 9,848,038 B2
(45) Date of Patent: Dec. 19, 2017

(54) SYSTEM, METHOD, AND DEVICE FOR PROVIDING APPLICATION SERVICE

(71) Applicant: Huawei Technologies Co., Ltd., Shenzhen, Guangdong (CN)

(72) Inventors: Zhiming Zhu, Shenzhen (CN); Mingrong Cao, Bonn (DE); Chengkai He, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 288 days.

(21) Appl. No.: 14/755,857

(22) Filed: Jun. 30, 2015

(65) Prior Publication Data

US 2015/0304405 A1 Oct. 22, 2015

Related U.S. Application Data

(63) Continuation of application No. PCT/CN2012/088127, filed on Dec. 31, 2012.

(51) Int. Cl.
*G06F 15/16* (2006.01)
*H04L 29/08* (2006.01)
*H04L 29/06* (2006.01)

(52) U.S. Cl.
CPC .......... *H04L 67/10* (2013.01); *H04L 65/1063* (2013.01); *H04L 65/1069* (2013.01); *H04L 67/1004* (2013.01)

(58) Field of Classification Search
CPC .. H04L 65/10; H04L 65/1063; H04L 67/1023
USPC ........................................................ 709/219
See application file for complete search history.

(56) References Cited

U.S. PATENT DOCUMENTS

| 7,804,818 B1 | 9/2010 | Atluri et al. |
| 8,451,800 B2 | 5/2013 | Kuvvali et al. |
| 8,751,571 B2 * | 6/2014 | Rajagopalan ........... G06F 15/16 709/204 |

(Continued)

FOREIGN PATENT DOCUMENTS

| CN | 1599376 A | 3/2005 |
| CN | 1852551 A | 10/2006 |

(Continued)

OTHER PUBLICATIONS

J. Rosenberg, et al., "SIP: Session Initiation Protocol", Network Working Group, Jun. 2002, 270 pages.

(Continued)

*Primary Examiner* — Wing F Chan
*Assistant Examiner* — Andrew Woo

(57) ABSTRACT

Embodiments of the present invention provide a system, method, and device for providing an application service, including: a first access network device is connected to a first application server through a first interface, and the first application server is configured to process an application request received from the first access network device, where the application request is received by the first access network device from a user equipment. According to the embodiments of the present invention, an application server is deployed on a radio access network side, and the application server is capable of adjusting network sending scheduling according to a network environment, which can guarantee sending of service content and improve user experience.

7 Claims, 20 Drawing Sheets

(56) References Cited

U.S. PATENT DOCUMENTS

2009/0265419 A1 10/2009 Branda et al.
2013/0150007 A1 6/2013 Wang et al.
2013/0265917 A1 10/2013 Lv et al.
2014/0310339 A1 10/2014 Yong et al.

FOREIGN PATENT DOCUMENTS

| CN | 101222424 A | 7/2008 |
| CN | 101917742 A | 12/2010 |
| CN | 101932029 A | 12/2010 |
| CN | 102014053 A | 4/2011 |
| CN | 102171664 A | 8/2011 |
| CN | 102281521 A | 12/2011 |
| CN | 102594875 A | 7/2012 |
| CN | 103548314 A | 1/2014 |
| KR | 20120109619 A | 10/2012 |
| WO | 2011/098920 A1 | 8/2011 |

OTHER PUBLICATIONS

Hechmi Khlifi, et al., "IMS Application Servers: Roles Requirements, and Implementation Technologies", IEEE Internet Computing, May 1, 2008, p. 40-51.

\* cited by examiner

SYSTEM, METHOD, AND DEVICE FOR PROVIDING APPLICATION SERVICE

CROSS-REFERENCE TO RELATED APPLICATIONS

This application is a continuation of International Application No. PCT/CN2012/088127, filed on Dec. 31, 2012, which is hereby incorporated by reference in its entirety.

TECHNICAL FIELD

Embodiments of the present invention relate to the field of communications technologies, and in particular, to a system, method, and device for providing an application service.

BACKGROUND

As smart devices are quickly becoming a popular choice, mobile Internet is experiencing growth, and wireless network technologies are finding increased use, users express preference to have wired-like service experience, namely, smooth, uninterrupted access at short delay.

In the prior art, a content delivery network (Content Delivery Network, CDN) is always deployed behind a core network. For example, an application server (App Server) is deployed between a core network and the Internet (Internet). The CDN cannot perceive a change of a wireless environment, and consequently cannot adapt a service provided for a user equipment to the varying wireless environment, which ultimately degrades user experience. For example, a high-definition bandwidth-consuming video is provided in low-bandwidth environment, and consequently video playback is not smooth.

SUMMARY

Embodiments of the present invention disclose a system, method, and device for providing an application service. According to the method of the present invention, application and content services are deployed on a radio access network side, and the radio access network side may provide an application service for a user.

According to a first aspect, the present invention provides a system for providing an application service, where the system includes:

a first access network device and a first application server, where: the first access network device is a base station or a base station controller;

a first interface exists between the first access network device and the first application server;

the first application server is configured to receive, through the first interface, an application request sent by the first access network device, where the application request is received by the first access network device from a user equipment; and the first application server is further configured to determine whether to process an application service corresponding to the application request.

With reference to the first aspect, in a first possible implementation, the system further includes a core network device; and a second interface exists between the first application server and the core network device.

With reference to the first possible implementation of the first aspect, in a second possible implementation, the system further includes a second access network device; and a first interface exists between the first application server and the second access network device.

With reference to the first aspect or the first possible implementation of the first aspect, in a third possible implementation, the system further includes a core network device; and a third interface exists between the first access network device and the core network device.

With reference to the third possible implementation of the first aspect, in a fourth possible implementation, the first access network device is further configured to determine, according to an offload policy, a target device to which the application request is to be sent, where the target device is the first application server or the core network device.

With reference to the first aspect, in a fifth possible implementation, the system further includes a second application server and a core network device;

a fourth interface exists between the first application server and the second application server; and a fifth interface exists between the second application server and the core network device.

With reference to the fifth possible implementation, in a sixth possible implementation, the system further includes a second access network device and a third application server; and a sixth interface exists between the first application server and the third application server, a first interface exists between the third application server and the second access network device, and a fourth interface exists between the third application server and the second application server.

With reference to any one of the first possible implementation of the first aspect to the sixth possible implementation of the first aspect, in a seventh possible implementation, in a case in which the first application server determines to process the application service corresponding to the application request, the first application server is specifically configured to determine an application response according to the application request, where the application response is corresponding to the application service.

With reference to any one of the first possible implementation of the first aspect to the fourth possible implementation of the first aspect, in an eighth possible implementation, in a case in which the first application server determines not to process the application service corresponding to the application request, the first application server is further configured to send the application request to the core network device;

the core network device is configured to send the application request to a service provider, so that the service provider determines an application response according to the application request, where the application response is corresponding to the application service; and the core network device is further configured to receive the application response sent by the service provider, and send the application response to the first application server.

With reference to the fifth possible implementation of the first aspect or the sixth possible implementation of the first aspect, in a ninth possible implementation, in a case in which the first application server determines not to process the application service corresponding to the application request, the first application server is further configured to send the application request to the second application server;

the second application server is configured to determine whether to process the application service corresponding to the application request;

in a case in which the second application server determines to process the application service corresponding to the application request, the second application server is further configured to determine an application response according to the application request, where the application response is corresponding to the application service;

in a case in which the second application server determines not to process the application service corresponding to the application request, the second application server is further configured to send the application request to the core network device, and the core network device is configured to send the application request to a service provider, so that the service provider determines an application response according to the application request, where the application response is corresponding to the application service, and the second application server is further configured to receive the application response sent by the service provider; and the second application server is further configured to send the application response to the first application server in a case in which the application response is determined or the application response is received.

With reference to the sixth possible implementation of the first aspect, in a tenth possible implementation, in a case in which the first application server determines not to process the application service corresponding to the application request, the first application server is further configured to send the application request to the third application server;

the third application server is configured to determine whether to process the application service corresponding to the application request;

in a case in which the third application server determines to process the application service corresponding to the application request, the third application server is further configured to determine an application response according to the application request, where the application response is corresponding to the application service;

in a case in which the third application server determines not to process the application service corresponding to the application request, the third application server is further configured to send the application request to the core network device, and the core network device is configured to send the application request to a service provider, so that the service provider determines an application response according to the application request, where the application response is corresponding to the application service, and the third application server is further configured to receive the application response sent by the service provider; and the third application server is further configured to send the application response to the first application server in a case in which the application response is determined or the application response is received.

With reference to any one of the seventh possible implementation of the first aspect to the tenth possible implementation of the first aspect, in an eleventh possible implementation, the first application server is further configured to determine a guarantee message according to the application response and a network environment, where the guarantee message is used for instructing the first access network device to guarantee sending of the application response;

the first application server is further configured to send the application response and the guarantee message to the first access network device;

the first access network device sends the application response to the user equipment according to the guarantee message; and a network state is restored in a case in which the first application server and the first access network device complete sending of the application response.

With reference to any one of the first possible implementation of the first aspect to the eleventh possible implementation of the first aspect, in a twelfth possible implementation, in a case in which the first application server is connected to one or more devices among the core network device, the second application server, and the third application server, the first application server is further configured to perform General Packet Radio Service GPRS Tunneling Protocol-User plane GTP-U decapsulation on received information to process the received information, where the received information includes the application request; and the first application server is further configured to perform GTP-U encapsulation on sent information to transmit the sent information in a transmission medium, where the sent information includes one or more pieces of the following information: the application request, the application response, and the guarantee message.

With reference to the first aspect or any one of the foregoing possible implementations, in a thirteenth possible implementation, the first application server is further configured to perform charging or interception.

According to a second aspect, the present invention provides an application server, where the application server is a first application server in a system for providing an application service and includes:

a transceiver and a processor, where:

the transceiver is connected to one or more first access network devices in the system through a first interface;

the transceiver is configured to receive an application request sent by the one or more first access network devices, where the application request is received by the one or more first access network devices from a user equipment;

the processor is configured to determine whether to process an application service corresponding to the application request;

the processor is further configured to determine an application response according to the application request in a case in which the processor determines to process the application service corresponding to the application request, where the application response is corresponding to the application service; and the transceiver is further configured to send the application response determined by the processor to the one or more access network devices, so that the one or more access network devices send the application response to the user equipment.

With reference to the second aspect, in a first possible implementation, the transceiver is further connected to a core network device in the system through a second interface;

in a case in which the processor determines not to process the application request, the transceiver is further configured to send the application request to the core network device, so that the core network device sends the application request to a service provider, so that the service provider determines an application response according to the application request, where the application response is corresponding to the application service;

the transceiver is further configured to receive the application response sent by the core network device, where the application response is received by the core network device from the service provider; and the transceiver is further configured to send the application response to the one or more access network devices, so that the one or more access network devices send the application response to the user equipment.

With reference to the second aspect, in a second possible implementation, the transceiver is further connected to a second application server in the system through a fourth interface;

in a case in which the processor determines not to process the application request, the transceiver is further configured to send the application request to the second application server, so that the second application server acquires the application response;

the transceiver is further configured to receive the application response sent by the second application server; and the transceiver is further configured to send the application response to the one or more access network devices, so that the one or more access network devices send the application response to the user equipment.

With reference to the second aspect, in a third possible implementation, the transceiver is further connected to a third application server in the system through a sixth interface;

in a case in which the processor determines not to process the application request, the transceiver is further configured to send the application request to the second application server, so that the second application server acquires the application response;

the transceiver is further configured to receive the application response sent by the second application server; and the transceiver is further configured to send the application response to the one or more access network devices, so that the one or more access network devices send the application response to the user equipment.

With reference to the third possible implementation of the second aspect, in a fourth possible implementation, the transceiver is further configured to receive an application request sent by the third application server;

the processor is further configured to determine whether to process the application request sent by the third application server;

the processor is further configured to: in a case in which the processor determines to process the application request sent by the third application server, determine, according to the application request sent by the third application server, an application response corresponding to the application request sent by the third application server;

the transceiver is further configured to send, to the third application server, the application response corresponding to the application request sent by the third application server; and the transceiver is further configured to send a negative notification to the third application server in a case in which the processor determines not to process the application request sent by the third application server, wherein the negative notification is used wherein the negative notification is used for notifying the third application server that the processor determines not to process the application request sent by the third application server.

With reference to the second aspect or any one of the foregoing possible implementations of the second aspect, in a fifth possible implementation, the processor is further configured to determine guarantee information according to the application response and a network environment;

the transceiver is further configured to send the guarantee information to the one or more first access network devices, where the guarantee message is used for instructing the first access network device to guarantee sending of the application response; and the processor is further configured to determine to restore a network state in a case in which the transceiver completes sending of the guarantee message and the application response.

With reference to the second aspect, in a sixth possible implementation, in a case in which the transceiver is connected to one access network device in the system through the first interface, the one access network device is connected to a core network device in the system through a third interface, and the processor determines not to process the application request, the transceiver is further configured to send a negative notification to the at least one first access network device, for notifying the first access network device that the application server is not capable of processing the application service corresponding to the application request.

With reference to the second aspect or any one of the first possible implementation to the fifth possible implementation of the second aspect, in a seventh possible implementation, the processor is further configured to perform General Packet Radio Service GPRS Tunneling Protocol-User plane GTP-U decapsulation on information received by the transceiver, and perform GTP-U encapsulation on information sent by the transceiver.

According to a third aspect, the present invention provides an application server, where the application server is each second application server in a system for providing an application service and includes:

a transceiver and a processor, where:

the transceiver is connected to a first application server in the system through a fourth interface, and the transceiver is connected to a core network in the system through a fifth interface;

the transceiver is configured to receive an application request sent by the first application server;

the processor is configured to determine whether to process an application service corresponding to the application request;

the processor is further configured to determine an application response according to the application request in a case in which the processor determines to process the application request, where the application response is corresponding to the application service; and the transceiver is further configured to send the application response to the first application server.

With reference to the third aspect, in a first possible implementation, in a case in which the processor determines not to process the application service corresponding to the application request, the transceiver is further configured to send the application request to the core network device, so that the core network device sends the application request to a service provider, so that the service provider determines an application response according to the application request, where the application response is corresponding to the application service;

the transceiver is further configured to receive the application response sent by the core network device, where the application response is received by the core network device from the service provider; and the transceiver is further configured to send the application response to the first application server.

According to a fourth aspect, the present invention provides an access network device, where the access network device is a first access network device in a system for providing an application service and includes:

a receiver and a transmitter, where:

the receiver is connected to a first application server in the system through a first interface, and the transmitter is connected to the first application server in the system through the first interface;

the receiver is configured to receive an application request sent by a user equipment; and the transmitter is configured to send the application request to the first application server.

With reference to the fourth aspect, in a first possible implementation, the receiver is further connected to a core network device in the system through a third interface, and the transmitter is further connected to the core network device through the third interface;

the transmitter is specifically configured to send the application request to the first application server according to an offload policy; and the transmitter is further configured to send the application request to the core network device according to the offload policy.

With reference to the first possible implementation, in a second possible implementation, the receiver is further configured to receive a negative notification sent by the first application server, where the negative notification is used for notifying the first access network device that the application server is not capable of processing an application service corresponding to the application request; and the transmitter is further configured to send the application request to the core network device in a case in which the receiver receives the negative notification.

With reference to the fourth aspect or the first possible implementation of the fourth aspect, in a third possible implementation, the receiver is further configured to receive an application response and guarantee information that are sent by the first application server; and the transmitter is further configured to send the application response to the user equipment according to the guarantee information.

With reference to the first possible implementation or the second possible implementation of the fourth aspect, in a fourth possible implementation, the receiver is further configured to receive an application response sent by the core network device; and the transmitter is further configured to send the application response to the user equipment.

According to a fifth aspect, the present invention provides a core network device, where the core network device is a core network device in a system for providing an application service and includes:

a receiver and a transmitter, where:

the receiver is configured to receive an application request, where the application request is corresponding to an application service;

the transmitter is configured to send the application request to a service provider, so that the service provider determines an application response according to the application request, where the application response is corresponding to the application service; and the receiver is further configured to receive the application response sent by the service provider.

With reference to the fifth aspect, in a first possible implementation, in a case in which the receiver is connected, through a second interface, to a first application server in the system for providing an application service and the transmitter is connected to the first application server through the second interface, the receiver is specifically configured to receive the application request sent by the first application server, and the transmitter is further configured to send the application response to the first application server;

in a case in which the receiver is connected, through a fifth interface, to a second application server in the system for providing an application service and the transmitter is connected to the second application server through the fifth interface, the receiver is specifically configured to receive the application request sent by the second application server, and the transmitter is further configured to send the application response to the second application server; and in a case in which the receiver is connected, through a third interface, to a first access network device in the system for providing an application service, and the transmitter is connected to the first access network device through the third interface, the receiver is specifically configured to receive the application request sent by the first access network device, and the transmitter is further configured to send the application response to the first access network device.

According to a sixth aspect, the present invention provides an application server, where the application server is a first application server in a system for providing an application service and includes:

a transceiver and a processor, where:

the transceiver is configured to receive an application request sent by a first access network device, where the application request is received by the first access network device from a user equipment, and the application request is corresponding to an application service;

the processor is configured to acquire an application response, where the application response is corresponding to the application service; and the processor is further configured to control a charging or interception process.

With reference to the sixth aspect, in a first possible implementation, that the processor is configured to control a charging or interception process includes that:

the processor is specifically configured to send a copy of the application request to a core network device in the system through the transceiver, to instruct the core network device to start performing charging or interception; and the processor is specifically configured to send a copy of the application response to the core network device through the transceiver, to instruct the core network device to perform charging or interception.

With reference to the sixth aspect, in a second possible implementation, the transceiver is further configured to receive a charging or interception notification sent by the core network device, where the charging or interception notification is used for indicating charging or interception.

With reference to the second possible implementation of the sixth aspect, in a third possible implementation, that the processor is configured to control a charging or interception process includes that:

the processor is configured to determine, according to the charging or interception notification, whether to perform charging or interception;

the processor is further configured to: in a case in which the processor determines to perform interception, skip processing the application service corresponding to the application request, and send the application request to the core network device in the system through the transceiver, to instruct the core network to start charging or interception; and the processor is further configured to: in a case in which the processor determines not to perform interception, process the application service corresponding to the application request, perform charging, and send charging information to the core network device through the transceiver, for notifying the core network device of a charging result.

With reference to the second possible implementation of the sixth aspect, in a fourth possible implementation, that the processor is configured to control a charging or interception process includes that:

the processor is configured to perform charging, and send charging information to the core network device through the transceiver, for notifying the core network device of a charging result;

the processor is further configured to determine, according to the charging or interception notification, whether to perform charging or interception; and the processor is further configured to: in a case in which the processor determines to perform interception, send a copy of the application request and a copy of the application response to the core network device through the transceiver, to instruct the core network device to perform interception.

According to a seventh aspect, the present invention provides a core network device, where the core network device is a core network device in a system for providing an application service and includes:

a receiver and a processor, where:

the receiver is configured to receive one or more pieces of the following information sent by a first application server in the system: charging information, an application request, a copy of the application request, and a copy of an application response; and the processor is configured to perform charging or interception.

With reference to the seventh aspect, in a first possible implementation, the processor is specifically configured to perform interception in a case in which the receiver receives the application request;

the processor is specifically configured to perform interception in a case in which the receiver receives the copy of the application request and the copy of the application response; or the processor is specifically configured to perform charging or interception in a case in which the transceiver receives the copy of the application request or the copy of the application response.

With reference to the seventh aspect or the first possible implementation of the seventh aspect, in a second possible implementation, the core network device further includes a transmitter, where the transmitter is configured to send a charging or interception notification to the first application server, so that the first application server determines, according to the charging or interception notification, whether to perform charging or interception.

According to an eighth aspect, the present invention provides an access network device, where the access network device is a first access network device in a system for providing an application service and includes:

a receiver, a processor, and a transmitter, where:

the receiver is connected to a first application server through a first interface, and the transmitter is connected to the first application server through the first interface;

the receiver is configured to receive a local application enable flag sent by a core network device in the system;

the processor is configured to determine, according to the local application enable flag, whether to allow a local application to perform charging or interception; and in a case in which the processor determines to allow using the local application to perform charging or interception, the transmitter is configured to send uplink data of a user equipment to the first application server in a case in which the processor determines to allow using the local application, the processor is further configured to collect charging information of the user equipment periodically, and the transmitter is further configured to send the charging information to the core network device; or in a case in which the processor determines not to allow the local application to perform charging or interception, the transmitter is configured to send uplink data of a user equipment to the core network device, or the transmitter is further configured to send the uplink data of the user equipment to the first application server and send a copy of data of the user equipment to the core network device.

According to a ninth aspect, the present invention provides a core network device, where the core network device is a core network device in a system for providing an application service and includes:

a receiver and a transmitter, where:

the transmitter is configured to send a local application enable flag to a first access network device in the system, so that the first access network device determines, according to the local application enable flag, whether to perform charging or interception; and the receiver is configured to receive charging information sent by the first access network device; or the receiver is configured to receive uplink data of a user equipment or a copy of data of the user equipment sent by the first access network device.

According to a tenth aspect, the present invention provides an application server, where the application server is a first application server in a system for providing an application service and includes:

a communication unit and a control unit, where:

the communication unit is connected to one or more first access network devices in the system through a first interface;

the communication unit is configured to receive an application request sent by the one or more first access network devices, where the application request is received by the one or more first access network devices from a user equipment;

the control unit is configured to determine whether to process an application service corresponding to the application request;

the control unit is further configured to determine an application response according to the application request in a case in which the control unit determines to process the application service corresponding to the application request, where the application response is corresponding to the application service; and the communication unit is further configured to send the application response determined by the control unit to the one or more access network devices, so that the one or more access network devices send the application response to the user equipment.

With reference to the tenth aspect, in a first possible implementation, the communication unit is further connected to a core network device in the system through a second interface;

in a case in which the control unit determines not to process the application request, the communication unit is further configured to send the application request to the core network device, so that the core network device sends the application request to a service provider, so that the service provider determines an application response according to the application request, where the application response is corresponding to the application service;

the communication unit is further configured to receive the application response sent by the core network device, where the application response is received by the core network device from the service provider; and the communication unit is further configured to send the application response to the one or more access network devices, so that the one or more access network devices send the application response to the user equipment.

With reference to the tenth aspect, in a second possible implementation, the communication unit is further connected to a second application server in the system through a fourth interface;

in a case in which the control unit determines not to process the application request, the communication unit is further configured to send the application request to the second application server, so that the second application server acquires the application response;

the communication unit is further configured to receive the application response sent by the second application server; and the communication unit is further configured to send the application response to the one or more access network devices, so that the one or more access network devices send the application response to the user equipment.

With reference to the tenth aspect, in a third possible implementation, the communication unit is further connected to a third application server in the system through a sixth interface;

in a case in which the control unit determines not to process the application request, the communication unit is further configured to send the application request to the second application server, so that the second application server acquires the application response;

the communication unit is further configured to receive the application response sent by the second application server; and the communication unit is further configured to send the application response to the one or more access network devices, so that the one or more access network devices send the application response to the user equipment.

With reference to the third possible implementation of the tenth aspect, in a fourth possible implementation, the communication unit is further configured to receive an application request sent by the third application server;

the control unit is further configured to determine whether to process the application request sent by the third application server;

the control unit is further configured to: in a case in which the control unit determines to process the application request sent by the third application server, determine, according to the application request sent by the third application server, an application response corresponding to the application request sent by the third application server;

the communication unit is further configured to send, to the third application server, the application response corresponding to the application request sent by the third application server; and the communication unit is further configured to send a negative notification to the third application server in a case in which the control unit determines not to process the application request sent by the third application server, wherein the negative notification is used for notifying the third application server that the control unit determines not to process the application request sent by the third application server.

With reference to the tenth aspect or any one of the foregoing possible implementations of the tenth aspect, in a fifth possible implementation, the control unit is further configured to determine guarantee information according to the application response and a network environment;

the communication unit is further configured to send the guarantee information to the one or more first access network devices, where the guarantee message is used for instructing the first access network device to guarantee sending of the application response; and the control unit is further configured to determine to restore a network state in a case in which the communication unit completes sending of the guarantee message and the application response.

With reference to the tenth aspect, in a sixth possible implementation, in a case in which the communication unit is connected to one access network device in the system through the first interface, the one access network device is connected to a core network device in the system through a third interface, and the control unit determines not to process the application request, the communication unit is further configured to send a negative notification to the at least one first access network device, for notifying the first access network device that the application server is not capable of processing the application service corresponding to the application request.

With reference to the tenth aspect or any one of the first possible implementation to the fifth possible implementation of the tenth aspect, in a seventh possible implementation, the control unit is further configured to perform General Packet Radio Service GPRS Tunneling Protocol-User plane GTP-U decapsulation on information received by the communication unit, and perform GTP-U encapsulation on information sent by the communication unit.

According to an eleventh aspect, the present invention provides an application server, where the application server is each second application server in a system for providing an application service and includes:

a communication unit and a control unit, where:

the communication unit is connected to a first application server in the system through a fourth interface, and the communication unit is connected to a core network in the system through a fifth interface;

the communication unit is configured to receive an application request sent by the first application server;

the control unit is configured to determine whether to process an application service corresponding to the application request;

the control unit is further configured to determine an application response according to the application request in a case in which the control unit determines to process the application request, where the application response is corresponding to the application service; and the communication unit is further configured to send the application response to the first application server.

With reference to the eleventh aspect, in a first possible implementation, in a case in which the control unit determines not to process the application service corresponding to the application request, the communication unit is further configured to send the application request to the core network device, so that the core network device sends the application request to a service provider, so that the service provider determines an application response according to the application request, where the application response is corresponding to the application service;

the communication unit is further configured to receive the application response sent by the core network device, where the application response is received by the core network device from the service provider; and the communication unit is further configured to send the application response to the first application server.

According to a twelfth aspect, the present invention provides an access network device, where the access network device is a first access network device in a system for providing an application service and includes:

a receiving unit and a sending unit, where:

the receiving unit is connected to a first application server in the system through a first interface, and the sending unit is connected to the first application server in the system through the first interface;

the receiving unit is configured to receive an application request sent by a user equipment; and the sending unit is configured to send the application request to the first application server.

With reference to the twelfth aspect, in a first possible implementation, the receiving unit is further connected to a core network device in the system through a third interface, and the sending unit is further connected to the core network device through the third interface;

the sending unit is specifically configured to send the application request to the first application server according to an offload policy; and the sending unit is further configured to send the application request to the core network device according to the offload policy.

With reference to the first possible implementation in a second possible implementation, the receiving unit is further configured to receive a negative notification sent by the first application server, where the negative notification is used for notifying the first access network device that the application server is not capable of processing an application service corresponding to the application request; and the sending unit is further configured to send the application request to the core network device in a case in which the receiving unit receives the negative notification.

With reference to the twelfth aspect or the first possible implementation of the twelfth aspect, in a third possible implementation, the receiving unit is further configured to receive an application response and guarantee information that are sent by the first application server; and the sending unit is further configured to send the application response to the user equipment according to the guarantee information.

With reference to the first possible implementation of the twelfth aspect or the second possible implementation of the twelfth aspect, in a fourth possible implementation, the receiving unit is further configured to receive an application response sent by the core network device; and the sending unit is further configured to send the application response to the user equipment.

According to a thirteenth aspect, the present invention provides a core network device, where the core network device is a core network device in a system for providing an application service and includes:

a receiving unit and a sending unit, where:

the receiving unit is configured to receive an application request, where the application request is corresponding to an application service;

the sending unit is configured to send the application request to a service provider, so that the service provider determines an application response according to the application request, where the application response is corresponding to the application service; and the receiving unit is further configured to receive the application response sent by the service provider.

With reference to the thirteenth aspect, in a first possible implementation, in a case in which the receiving unit is connected, through a second interface, to a first application server in the system for providing an application service and the sending unit is connected to the first application server through the second interface, the receiving unit is specifically configured to receive the application request sent by the first application server, and the sending unit is further configured to send the application response to the first application server;

in a case in which the receiving unit is connected, through a fifth interface, to a second application server in the system for providing an application service and the sending unit is connected to the second application server through the fifth interface, the receiving unit is specifically configured to receive the application request sent by the second application server, and the sending unit is further configured to send the application response to the second application server; or in a case in which the receiving unit is connected, through a third interface, to a first access network device in the system for providing an application service and the sending unit is connected to the first access network device through the third interface, the receiving unit is specifically configured to receive the application request sent by the first access network device, and the sending unit is further configured to send the application response to the first access network device.

According to a fourteenth aspect, the present invention provides an application server, where the application server is a first application server in a system for providing an application service and includes:

a communication unit and a control unit, where:

the communication unit is configured to receive an application request sent by a first access network device, where the application request is received by the first access network device from a user equipment, and the application request is corresponding to an application service;

the control unit is configured to acquire an application response, where the application response is corresponding to the application service; and the control unit is further configured to control a charging or interception process.

With reference to the fourteenth aspect, in a first possible implementation, that the control unit is configured to control a charging or interception process includes that:

the control unit is specifically configured to send a copy of the application request to a core network device in the system through the communication unit, to instruct the core network device to start performing charging or interception; and the control unit is specifically configured to send a copy of the application response to the core network device through the communication unit, to instruct the core network device to perform charging or interception.

With reference to the fourteenth aspect, in a second possible implementation, the communication unit is further configured to receive a charging or interception notification sent by a core network device, where the charging or interception notification is used for indicating charging or interception.

With reference to the second possible implementation, in a third possible implementation, that the control unit is configured to control a charging or interception process includes that:

the control unit is configured to determine, according to the charging or interception notification, whether to perform charging or interception;

the control unit is further configured to: in a case in which the control unit determines to perform interception, skip processing the application service corresponding to the application request, and send the application request to the core network device in the system through the communication unit, to instruct the core network to start charging or interception; and the control unit is further configured to: in a case in which the control unit determines not to perform interception, process the application service corresponding to the application request, perform charging, and send charging information to the core network device through the communication unit, for notifying the core network device of a charging result.

With reference to the second possible implementation, in a fourth possible implementation, that the control unit is configured to control a charging or interception process includes that:

the control unit is configured to perform charging, and send charging information to the core network device through the communication unit, for notifying the core network device of a charging result;

the control unit is further configured to determine, according to the charging or interception notification, whether to perform charging or interception; and the control unit is further configured: in a case in which the control unit determines to perform interception, to send a copy of the application request and a copy of the application response to the core network device through the communication unit, to instruct the core network device to perform interception.

According to a fifteenth aspect, the present invention provides a core network device, where the core network device is a core network device in a system for providing an application service and includes:

a receiving unit and a control unit, where:

the receiving unit is configured to receive one or more pieces of the following information sent by a first application server in the system: charging information, an application request, a copy of the application request, and a copy of an application response; and the control unit is configured to perform charging or interception.

With reference to the fifteenth aspect, in a first possible implementation, the control unit is specifically configured to perform interception in a case in which the receiving unit receives the application request;

the control unit is specifically configured to perform interception in a case in which the receiving unit receives the copy of the application request and the copy of the application response; or the control unit is specifically configured to perform charging or interception in a case in which the receiving unit receives the copy of the application request or the copy of the application response.

With reference to the fifteenth aspect or the first possible implementation of the fifteenth aspect, in a second possible implementation, the core network device further includes a sending unit, where the sending unit is configured to send a charging or interception notification to the first application server, so that the first application server determines, according to the charging or interception notification, whether to perform charging or interception.

According to a sixteenth aspect, the present invention provides an access network device, where the access network device is a first access network device in a system for providing an application service and includes:

a receiving unit, a control unit, and a sending unit, where:

the receiving unit is connected to a first application server through a first interface, and the sending unit is connected to the first application server through the first interface;

the receiving unit is configured to receive a local application enable flag sent by a core network device in the system;

the control unit is configured to determine, according to the local application enable flag, whether to allow a local application to perform charging or interception; and in a case in which the control unit determines to allow using the local application to perform charging or interception, the sending unit is configured to send uplink data of a user equipment to the first application server in a case in which the control unit determines to allow using the local application, the control unit is further configured to collect charging information of the user equipment periodically, and the sending unit is further configured to send the charging information to the core network device; or in a case in which the control unit determines not to allow the local application to perform charging or interception, the sending unit is configured to send uplink data of a user equipment to the core network device, or the sending unit is further configured to send the uplink data of the user equipment to the first application server and send a copy of data of the user equipment to the core network device.

According to a seventeenth aspect, the present invention provides a core network device, where the core network device is a core network device in a system for providing an application service and includes:

a receiving unit and a sending unit, where:

the sending unit is configured to send a local application enable flag to a first access network device in the system, so that the first access network device determines, according to the local application enable flag, whether to perform charging or interception; and the receiving unit is configured to receive charging information sent by the first access network device; or the receiving unit is configured to receive uplink data of a user equipment or a copy of data of the user equipment sent by the first access network device.

According to an eighteenth aspect, the present invention provides a method for providing an application service, where the method is executed by a first application server in a system for providing an application service, where the first application server is connected to a first access network device in the system, and the method includes:

receiving an application request sent by the first access network device, where the application request is received by the first access network device from a user equipment;

determining whether to process an application service corresponding to the application request;

in a case in which it is determined to process the application service corresponding to the application request, determining an application response according to the application request; and sending the application response to the first access network device, so that the first access network device sends the application response to the user equipment.

With reference to the eighteenth aspect, in a first possible implementation, in a case in which it is determined not to process the application service corresponding to the application request, sending the application request to a target device;

receiving the application response sent by the target device, where the target device is a core network device, a second application server, or a third application server in the system; and sending the application response to the first access network device, so that the first access network device sends the application response to the user equipment.

With reference to the eighteenth aspect, in a second possible implementation, in a case in which it is determined not to process the application service corresponding to the application request, sending a negative notification to the first access network device, where the negative notification is used for notifying the first access network device that the application server is not capable of processing the application service corresponding to the application request.

With reference to the eighteenth aspect or the first possible implementation of the eighteenth aspect, in a third possible implementation, the method further includes:

determining a guarantee message according to the application response and a network environment, where the guarantee message is used for instructing the first access network device to guarantee sending of the application response;

in a case in which the application response is sent to the first access network device, sending the guarantee message to the first access network device, so that the first access network device sends the application response to the user equipment according to the guarantee message; and in a case in which sending of the application response is completed, restoring a network state.

According to a nineteenth aspect, the present invention provides a method for providing an application service, where the method is executed by a second application server in a system for providing an application service, where the second application server is connected to a first application server in the system, and the second application server is further connected to a core network device in the system, and the method includes:

receiving an application request sent by the first application server;

determining whether to process an application service corresponding to the application request;

in a case in which it is determined to process the application service corresponding to the application request, determining an application response according to the application request, where the application response is corresponding to the application service; and sending the application response to the first application server.

With reference to the nineteenth aspect, in a first possible implementation, in a case in which it is determined not to process the application service corresponding to the application request, the method further includes:

sending the application request to the core network device, so that the core network device sends the application request to a service provider, so that the service provider determines an application response according to the application request, where the application response is corresponding to the application service;

receiving the application response sent by the core network device; and sending the application response to the first application server.

According to a twentieth aspect, the present invention provides a method for providing an application service, where the method is executed by a first access network device in a system for providing an application service, where the first access network device is connected to a first application server in the system, and the method includes:

receiving an application request sent by a user equipment; and sending the application request to the first application server.

With reference to the twentieth aspect, in a first possible implementation, in a case in which the first access network device is further connected to a core network device in the system, the sending the application request to the first application server includes:

sending the application request to the first application server according to an offload policy; and the method further includes:

sending the application request to the core network device according to the offload policy.

With reference to the first possible implementation of the twentieth aspect, in a second possible implementation, the method further includes:

receiving a negative notification sent by the first application server, where the negative notification is used for notifying the first access network device that the application server is not capable of processing an application service corresponding to the application request; and sending the application request to the core network device.

With reference to the twentieth aspect or the first possible implementation of the twentieth aspect, in a third possible implementation, the method further includes:

receiving an application response and guarantee information that are sent by the first application server; and sending the application response to the user equipment according to the guarantee information.

With reference to the twentieth aspect or the first possible implementation of the twentieth aspect, in a fourth possible implementation, the method further includes:

receiving an application response sent by the core network device; and sending the application response to the user equipment.

According to a twenty-first aspect, the present invention provides a method for providing an application service, where the method is executed by a core network device in a system for providing an application service, and the method includes:

receiving an application request, where the application request is corresponding to an application service;

sending the application request to a service provider, so that the service provider determines an application response according to the application request, where the application response is corresponding to the application service; and receiving the application response sent by the service provider.

With reference to the twenty-first aspect, in a first possible implementation, in a case in which the core network device is connected to a first application server in the system and the application request is received from the first application server, the method further includes: sending the application response to the first application server;

in a case in which the core network device is connected to a second application server in the system and the application request is received from the second application server, the method further includes: sending the application response to the second application server; or in a case in which the core network device is connected to a first access network device in the system and the application request is received from the first access network device, the method further includes: sending the application response to the first access network device.

According to a twenty-second aspect, the present invention provides a method for charging or interception when an application service is provided, where the method is executed by a first application server in a system for providing an application service, where the first application server is connected to a first access network device in the system, and the method includes:

receiving an application request sent by the first access network device, where the application request is received by the first access network device from a user equipment, and the application request is corresponding to an application service; and triggering a charging or interception process.

With reference to the twenty-second aspect, in a first possible implementation, the charging or interception process includes:

sending a copy of the application request to a core network device, to instruct the core network device to start performing charging or interception; and in a case in which an application response is sent to the user equipment, sending a copy of the application response to the core network device, to instruct the core network device to perform charging or interception, where the application response is corresponding to the application service.

With reference to the twenty-second aspect, in a second possible implementation, the method further includes:

before the application request sent by the user equipment is received, receiving a charging or interception notification sent by a core network device, where the charging or interception notification is used for indicating a charging or interception rule.

With reference to the second possible implementation of the twenty-second aspect, in a third possible implementation, the charging or interception process includes:

in a case in which the application request sent by the user equipment is received, determining, according to the charging or interception notification, whether to perform charging or interception; and in a case in which it is determined to perform interception, skipping processing the application service corresponding to the application request, and sending the application request to the core network device, to instruct the core network device to start performing charging or interception; or in a case in which it is determined not to perform interception, processing the application service corresponding to the application request, and performing charging, and in a case in which an application response is sent to the user equipment, sending charging information to the core network device, for notifying the core network device of a charging result.

With reference to the second possible implementation of the twenty-second aspect, in a fourth possible implementation, the charging or interception process includes:

in a case in which the application request is received, performing charging, and in a case in which an application response is sent to the user equipment, sending charging information to the core network device, for notifying the core network device of a charging result;

in a case in which the charging information is sent to the core network device, determining, according to the charging or interception notification, whether to perform charging or interception; and in a case in which it is determined to perform interception, sending a copy of the application request and a copy of the application response to the core network device, to instruct the core network device to start performing interception.

According to a twenty-third aspect, the present invention provides a method for charging or interception when an application service is provided, where the method is executed by a core network device in a system for providing an application service, and the method includes:

receiving one or more pieces of the following information sent by a first application server in the system: charging information, an application request, a copy of the application request, and a copy of an application response;

in a case in which the application request is received, performing interception;

in a case in which the copy of the application request and the copy of the application response are received, performing interception; and in a case in which the copy of the application request or the copy of the application response is received, performing charging or interception.

With reference to the twenty-third aspect, in a first possible implementation, before the receiving one or more pieces of the following information sent by a first application server in the system: charging information, an application request, a copy of the application request, and a copy of an application response, the method further includes:

sending a charging or interception notification to the first application server, so that the first application server determines, according to the charging or interception notification, whether to perform charging or interception.

According to a twenty-fourth aspect, the present invention provides a method for charging or interception when an application service is provided, where the method is executed by a first access network device in a system for providing an application service, where the first access network device is connected to a first application server in the system, and the method includes:

receiving a local application enable flag sent by a core network device;

determining, according to the local application enable flag, whether to allow a local application to perform a charging or interception service; and in a case in which it is determined to allow the local application to perform charging or interception, sending uplink data of a user equipment to the first application server, collecting charging information of the user equipment periodically, and sending the charging information to the core network device; or in a case in which it is determined not to allow the local application to perform charging or interception, sending the uplink data of the user equipment to the core network device, or sending uplink data of a user equipment to the first application server and sending a copy of data of the user equipment to the core network device.

According to a twenty-fifth aspect, the present invention provides a method for charging or interception when an application service is provided, where the method is executed by a core network device in a system for providing an application service, and the method includes:

sending a local application enable flag to a first access network device in the system, so that the first access network device determines, according to the local application enable flag, whether to perform charging or interception; and receiving charging information sent by the first access network device; or receiving uplink data of a user equipment or a copy of data of the user equipment sent by the first access network device.

According to the embodiments of the present invention, an application server for providing content and application services is deployed on a radio access network side (Radio Access Network, RAN) by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, in a case in which the application server may process an application request, charging and interception of an application service are also deployed on the RAN side, which may reduce burden of the core network.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (Global System for Mobile Communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, an LTE frequency division duplex (Frequency Division Duplex, "FDD" for short) system, an LTE time division duplex (Time Division Duplex, "TDD" for short), a Universal Mobile Telecommunications System (Universal Mobile Telecommunication System, "UMTS" for short) or the like.

A UE (User Equipment, UE) may also be called a mobile terminal (Mobile Terminal, MT), a mobile user equipment, and the like, and may communicate with one or more core networks through a radio access network (for example, Radio Access Network, RAN). The user equipment may be a mobile terminal, such as a mobile phone (also referred to as a "cellular" phone) or a computer with a mobile terminal. For example, the user equipment may be a portable, pocket-sized, handheld, computer built-in, or in-vehicle mobile apparatus.

A base station may be a base station (Base Transceiver Station, BTS) in the GSM or CDMA, may also be a base station (NodeB) in the WCDMA, and may further be an eNB or e-NodeB in the LTE, which is not limited in the present invention.

A base station controller may be a BSC (Base Station Controller, base station controller), or an RNC (Radio Network Controller, radio network controller), or an eNodeB (evolved NodeB, evolved NodeB), which is not limited in the present invention.

Figure 1A:
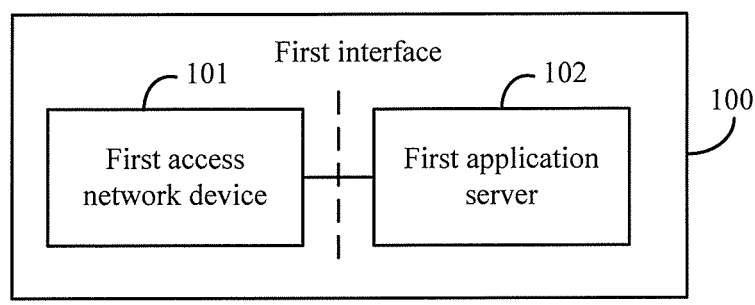
FIG. 1a is a schematic structural diagram of a system for providing an application service according to an embodiment of the present invention.

FIG. 1*a* is a schematic structural diagram of a system for providing an application service according to an embodiment of the present invention. As shown in FIG. 1*a*, the system 100 includes a first access network device 101 and a first application server 102. A first interface exists between the first access network device 101 and the first application server 102, where the first interface may be an internal interface or may be an external interface. Optionally, the first access network device 101 may be a base station or may be a base station controller.

It should be understood that for ease of description, only one first access network device and one first application server are shown in the system 100 in FIG. 1*a*. However, the system 100 in FIG. 1*a* may include multiple first access network devices and multiple first application servers, where a quantity of first access network devices may be the same as a quantity of first application servers, in other words, one first access network device is connected to one first application server through the first interface.

Figure 1B:
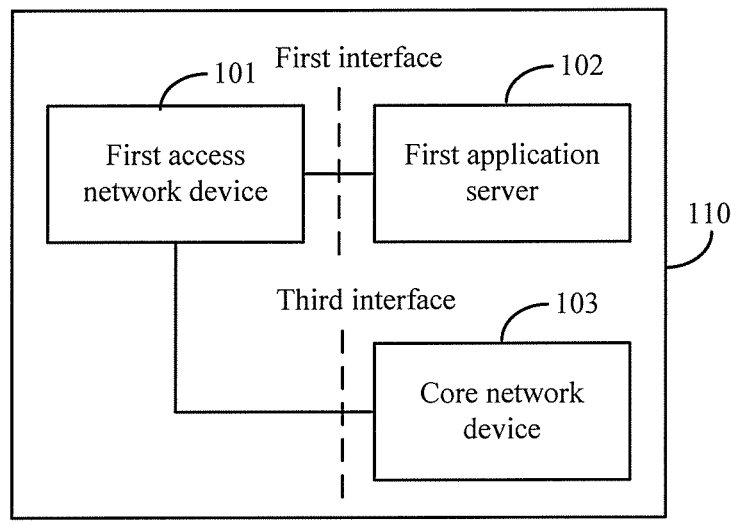
FIG. 1b is a schematic structural diagram of another system for providing an application service according to an embodiment of the present invention.

FIG. 1*b* is a schematic structural diagram of another system for providing an application service according to an embodiment of the present invention. As shown in FIG. 1*b*, the system 110 includes a first access network device 101, a first application server 102, and a core network device 103. A first interface exists between the first access network device 101 and the first application server 102. Optionally, the first interface may be an internal interface or may be an external interface. A third interface exists between the first access network device 101 and the core network device 103. Optionally, the first access network device 101 may be a base station or may be a base station controller.

It should be understood that for ease of description, only one first access network device and one first application server are shown in the system 110 in FIG. 1*b*. However, the system 110 in FIG. 1*b* may include multiple first access network devices and multiple first application servers, where a quantity of first access network devices is the same as a quantity of first application servers, in other words, one first access network device is connected to one first application server through the first interface. The core network device is connected to the multiple first access network devices through third interfaces.

Figure 1C:
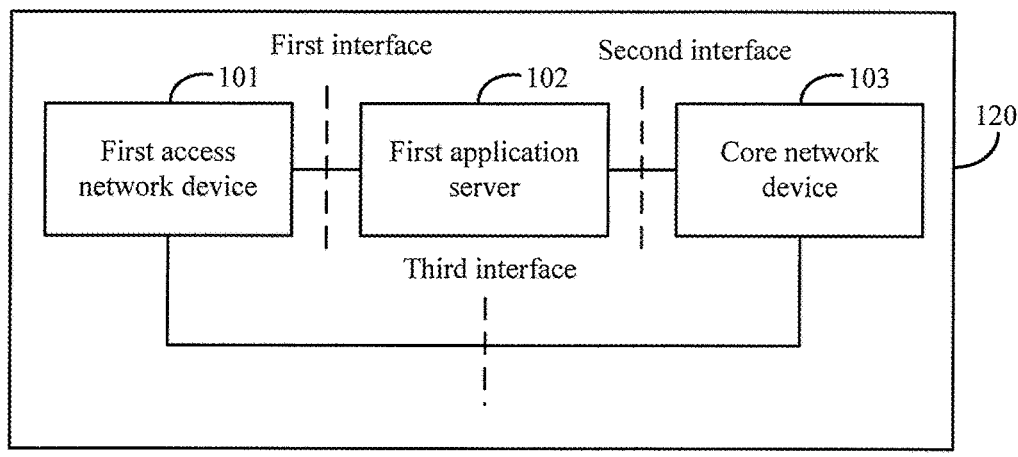
FIG. 1c is a schematic structural diagram of another system for providing an application service according to an embodiment of the present invention.

FIG. 1*c* is a schematic structural diagram of another system for providing an application service according to an embodiment of the present invention. As shown in FIG. 1*c*, the system 120 includes a first access network device 101, a first application server 102, and a core network device 103. A first interface exists between the first access network device 101 and the first application server 102, where the first interface may be an internal interface or may be an external interface. A second interface exists between the first application server 102 and the core network device 103, where the second interface may be an external interface. Optionally, the first access network device 101 may be a base station or may be a base station controller. A third interface may also exist between the first access network device 101 and the core network device 103.

It should be understood that for ease of description, only one first access network device and one first application server are shown in the system 120 in FIG. 1*c*. However, the system 120 in FIG. 1*c* may further include multiple first access network devices and multiple first application servers, where a quantity of first access network devices is the same as a quantity of first application servers, in other words, one first access network device is connected to one first application server through the first interface. The core network device is connected to the multiple first application servers through second interfaces.

Figure 1D:
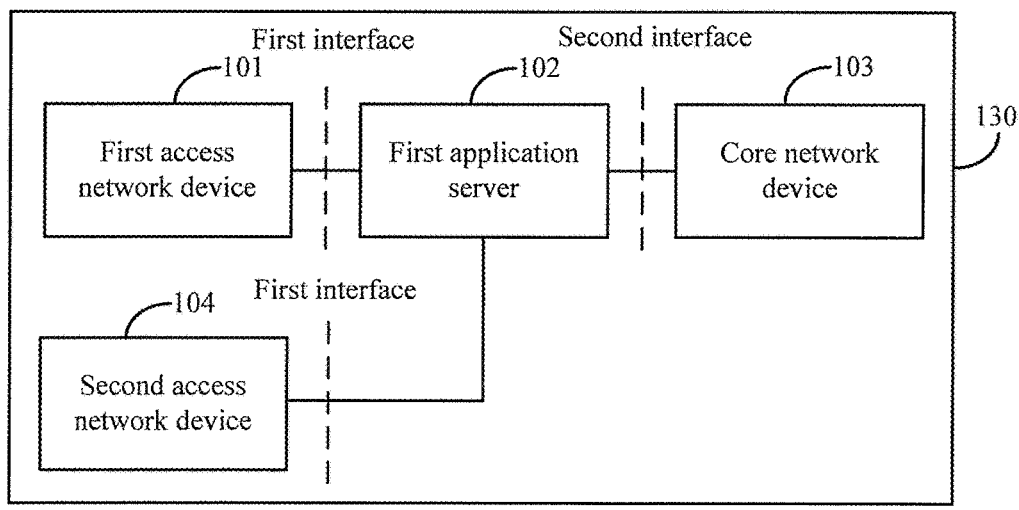
FIG. 1d is a schematic structural diagram of another system for providing an application service according to an embodiment of the present invention.

FIG. 1*d* is a schematic structural diagram of another system for providing an application service according to an embodiment of the present invention. As shown in FIG. 1*d*, the system 130 includes a first access network device 101, a first application server 102, a core network device 103, and a second access network device 104. A first interface exists between the first access network device 101 and the first application server 102, and a first interface also exists between the second access network device 104 and the first application server 102, where the first interface is an internal interface. A second interface exists between the first application server 102 and the core network device 103. Optionally, the second interface may be an internal interface or may be an external interface. Optionally, the first access network device 101 may be a base station or may be a base station controller.

It should be understood that for ease of description, only a first access network device and a second access network device are shown in the system 130 in FIG. 1*d*. The "first" and "second" in "first access network device" and "second access network device" in FIG. 1*d* are only used to distinguish different access network devices connected to the first application server, and interchange of "first" and "second" also falls within the protection scope of the present invention. The system 130 in FIG. 1*d* may further include multiple access network devices. The multiple access network devices are connected to the first application server through first interfaces.

Figure 1E:
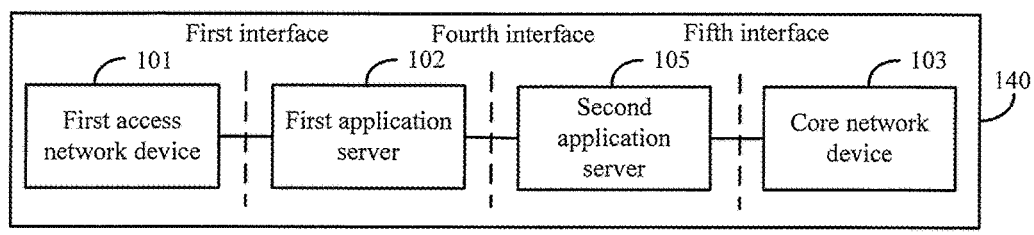
FIG. 1e is a schematic structural diagram of another system for providing an application service according to an embodiment of the present invention.

FIG. 1*e* is a schematic structural diagram of another system for providing an application service according to an embodiment of the present invention. As shown in FIG. 1*e* the system 140 includes a first access network device 101, a first application server 102, a core network device 103, and a second application server 105. A first interface exists between the first access network device 101 and the first application server 102. Optionally, the first interface may be an internal interface or may be an external interface. A fourth interface exists between the first application server 102 and the second application server 105. A fifth interface exists between the second application server 105 and the core network device 103. Optionally, the fifth interface may be an internal interface or may be an external interface. A sixth interface exists between the first application server 102 and the third application server 106.

It should be understood that for ease of description, only one first access network device and one first application server are shown in the system 140 in FIG. 1*e*. However, the system 140 in FIG. 1*e* may include multiple first access network devices and multiple first application servers, where a quantity of first access network devices is the same as a quantity of first application servers, in other words, one first access network device is connected to one first application server through the first interface. The second application server is connected to the multiple first application servers through fourth interfaces.

Figure 1F:
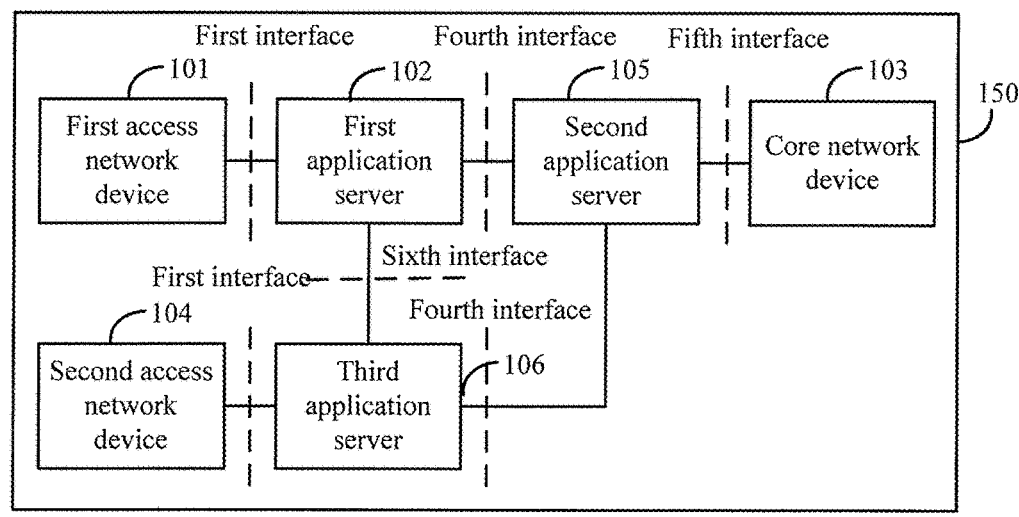
FIG. 1f is a schematic structural diagram of another system for providing an application service according to an embodiment of the present invention.

FIG. 1*f* is a schematic structural diagram of another system for providing an application service according to an embodiment of the present invention. As shown in FIG. 1*f*, the system 150 includes a first access network device 101, a first application server 102, a core network device 103, a second access network device 104, a second application server 105, and a third application server 106. A first interface exists between the first access network device 101 and the first application server 102. A first interface exists between the second access network device 104 and the third application server 106. Optionally, the first interface may be an internal interface or may be an external interface. A fourth interface exists between the first application server 102 and the second application server 105. A fourth interface exists between the third application server 106 and the second application server 105. A fifth interface exists between the second application server 105 and the core network device 103. Optionally, the fifth interface may be an internal interface or may be an external interface. A sixth interface exists between the first application server 102 and the third application server 106.

It should be understood that for ease of description, only one first access network device, one second access network device, one first application server, and one third application server are shown in the system 150 in FIG. 1*f*. However, the system 150 in FIG. 1*f* may further include multiple first access network devices, multiple second access network devices, multiple first application servers, and multiple third application servers, where a quantity of first access network devices, a quantity of second access network devices, a quantity of first application servers, and a quantity of third application servers are the same, in other words, one first access network device is connected to one first application server through a first interface, one second access network device is connected to one third application server through a first interface, and one first application server is connected to one third application server through a sixth interface. The second application server is connected to the multiple first application servers and multiple third application servers through fourth interfaces. In addition, the "first", "second", and "third" in "first access network device", "second access network device", "first application server" and "third application server" in FIG. 1*f* are merely used to distinguish different access network devices or application servers, but functions of the access network devices and application servers may be the same. That is to say, the "first" and "second" in "first access network device" and "second access network device" may be interchanged, and/or the "first" and "third" in "first application server" and "third application server" may be interchanged, without going beyond the protection scope of the present invention. It should be noted that in a case in which the second application server has functions different from those of the first application server and third application server in FIG. 1*f*, the second application server cannot be interchanged with the first application server and third application server. If the functions of the second application server are the same as those of the first application server and third application server, the second application server may be interchanged with the first application server and third application server.

Optionally, in the system in FIG. 1*a* to FIG. 1*f*, the first access network device collects information about a wireless network environment periodically, and sends the information about the wireless network environment to the first application server periodically, so that the first application server and the first access network device adjust network sending scheduling according to the wireless network environment and an application response, to guarantee sending of the application response that carries content of an application service.

Optionally, in the system in FIG. 1*c* to FIG. 1*f*, when receiving data, the first application server, second application server, and/or third application server performs GPRS Tunneling Protocol-User plane (GPRS Tunneling Protocol-User Plane, GTP-U) decapsulation on the received data and then processes the decapsulated data (for example, an application request), and in a case in which data needs to be sent, performs GTP-U encapsulation on the data to be sent (for example, an application response), so that the data is transmitted in a transmission medium.

Optionally, the first application server may be further configured to provide a charging or interception service.

According to the system in FIG. 1*a* to FIG. 1*f*, an application server for providing content and application services is deployed on a radio access network side (Radio Access Network, RAN) by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, in a case in which the application server may process an application request, charging and interception of an application service are also deployed on the RAN side, which may reduce burden of the core network.

Figure 2:
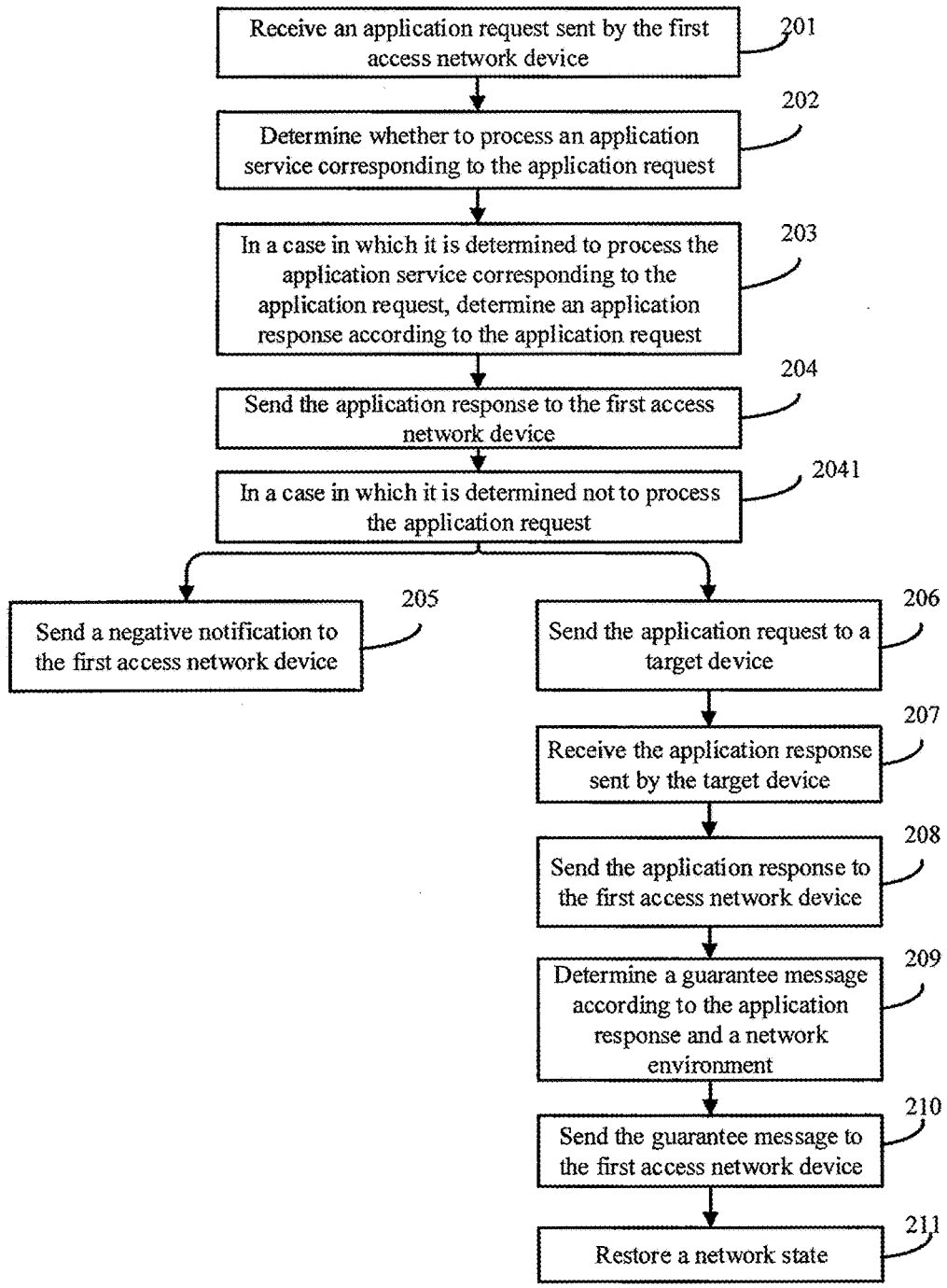
FIG. 2 is a schematic flowchart of a method for providing an application service according to an embodiment of the present invention.

FIG. 2 is a schematic flowchart of a method for providing an application service according to an embodiment of the present invention. The method in FIG. 2 may be applied to the system for providing an application service in FIG. 1*a* to FIG. 1*f*, and is executed by a first application server in the corresponding system.

201. Receive an application request sent by a first access network device, where the application request is received by the first access network device from a user equipment.

202. Determine whether to process an application service corresponding to the application request.

203. In a case in which it is determined to process the application service corresponding to the application request, determine an application response according to the application request.

204. Send the application response to the first access network device, so that the first access network device sends the application response to the user equipment.

2041. Optionally, in a case in which the method in FIG. 2 is applied in the system for providing an application service in FIG. 1 b, in a case in which the first application server determines not to process the application service corresponding to the application request, the method may further include step 205.

205. Send a negative notification to the first access network device, where the negative notification is used for notifying the first access network device that the application server is not capable of processing the application service corresponding to the application request.

Optionally, in a case in which the method in FIG. 2 is applied in the system for providing an application service in FIG. 1c to FIG. 1f, in a case in which the first application server determines not to process the application service corresponding to the application request, the method may further include step 206 to step 211.

206. Send the application request to a target device.

207. Receive the application response sent by the target device, where the target device is a core network device in the system in a case in which the method in FIG. 2 is applied in FIG. 1c and FIG. 1d. In a case in which the method in FIG. 2 is applied in FIG. 1e and FIG. 1f, the target device is a second application server in the system. In a case in which the method in FIG. 2 is applied in FIG. 1f, the target device is a third application server in the system or a second application server in the system.

208. Send the application response to the first access network device, so that the first access network device sends the application response to the user equipment.

209. Determine a guarantee message according to the application response and a network environment, where the guarantee message is used for instructing the first access network device to guarantee sending of the application response.

Optionally, the first application server may periodically receive information about a wireless network environment that is sent by the first access network device.

210. In a case in which the application response is sent to the first access network device, send the guarantee message to the first access network device, so that the first access network device sends the application response to the user equipment according to the guarantee message.

It should be noted that step 209 may be executed before step 208, and that step 210 may be executed with step 208 simultaneously.

211. In a case in which sending of the application response is completed, restore a network state.

According to the method shown in FIG. 2, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved.

Figure 3:
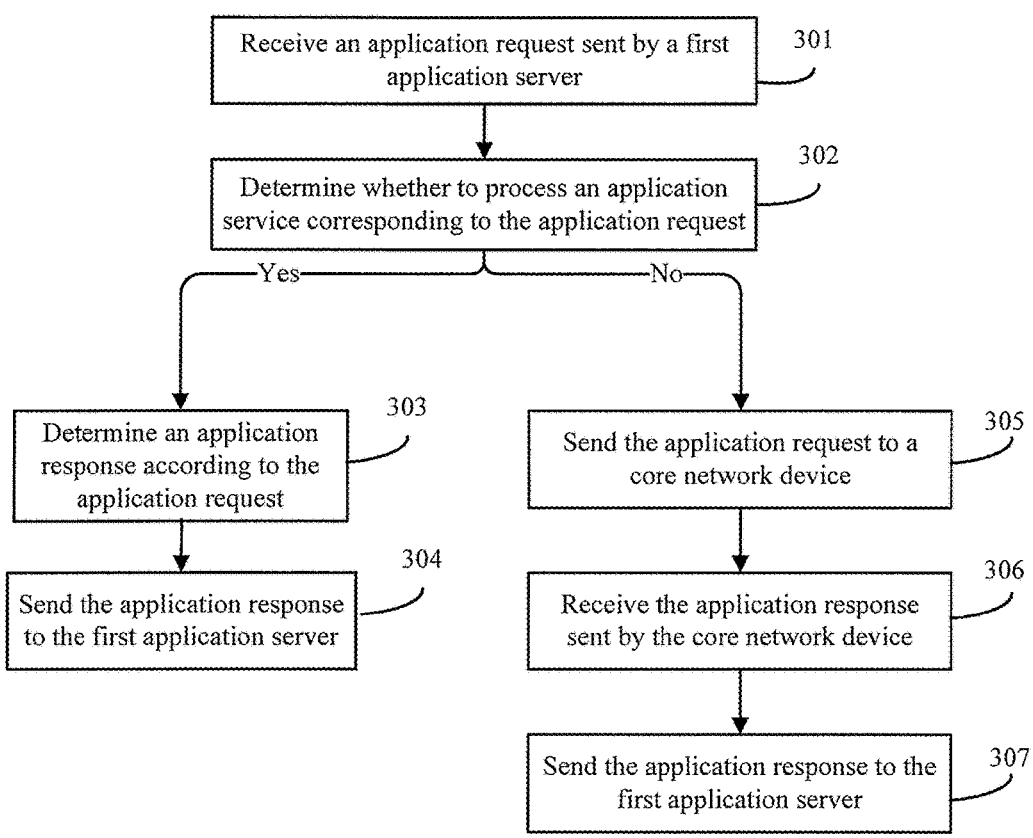
FIG. 3 is a schematic flowchart of a method for providing an application service according to an embodiment of the present invention.

FIG. 3 is a schematic flowchart of a method for providing an application service according to an embodiment of the present invention. The method in FIG. 3 may be applied to the system for providing an application service in FIG. 1e and FIG. 1f, and is executed by a second application server in the corresponding system.

301. Receive an application request sent by a first application server.

302. Determine whether to process an application service corresponding to the application request.

303. In a case in which it is determined to process the application service corresponding to the application request, determine an application response according to the application request, where the application response is corresponding to the application service.

304. Send the application response to the first application server.

Optionally, in a case in which the second application server determines not to process the application service corresponding to the application request, the method further includes step 305 to step 307.

305. Send the application request to a core network device, so that the core network device sends the application request to a service provider, so that the service provider determines an application response according to the application request, where the application response is corresponding to the application service.

306. Receive the application response sent by the core network device.

307. Send the application response to the first application server.

According to the method shown in FIG. 3, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. A second application server may further provide an application service for a user equipment in a case in which a first application server is not capable of providing the application service for the user equipment. Therefore, a capability of processing an application request on the RAN side by the application server can be improved, and thereby workload of a core network device may be reduced.

Figure 4:
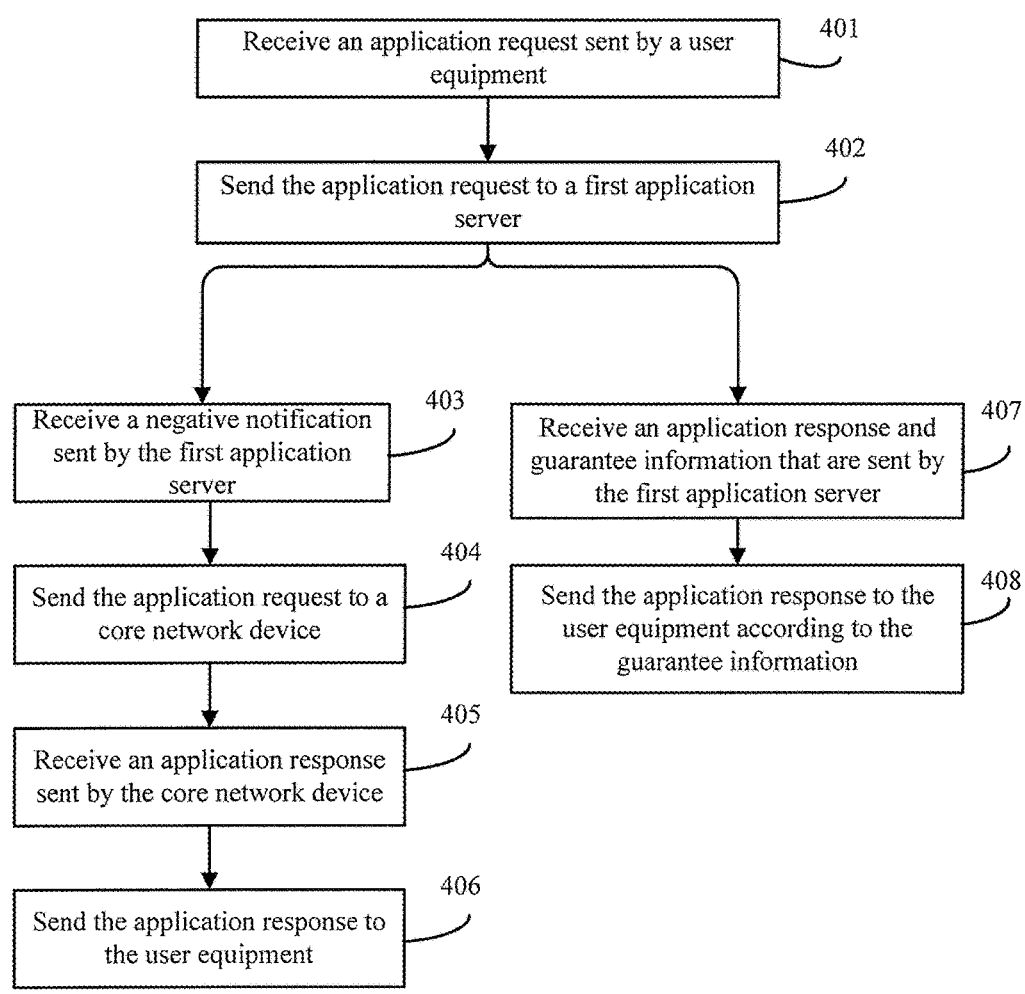
FIG. 4 is a schematic flowchart of a method for providing an application service according to an embodiment of the present invention.

FIG. 4 is a schematic flowchart of a method for providing an application service according to an embodiment of the present invention. The method in FIG. 4 may be applied to the system for providing an application service in FIG. 1a to FIG. 1f, and is executed by a first access network device in the corresponding system.

401. Receive an application request sent by a user equipment.

402. Send the application request to a first application server.

Optionally, in a case in which the method in FIG. 4 is applied in the system in FIG. 1b, or in a case in which the method in FIG. 4 is applied in FIG. 1c and a third interface exists between the first access network device and a core network device, the application request is sent to the first application server according to an offload policy, or the application request is sent to the core network device according to the offload policy.

In a case in which the method in FIG. 4 is applied in the system in FIG. 1b, step 403 and step 404 may be further included.

403. Receive a negative notification sent by the first application server, where the negative notification is used for notifying the first access network device that the application server is not capable of processing an application service corresponding to the application request.

404. Send the application request to the core network device.

In a case in which the method in FIG. 4 is applied in the system in FIG. 1b, step 405 and step 406 may be further included.

405. Receive an application response sent by the core network device.

406. Send the application response to the user equipment.

In a case in which the method in FIG. 4 is applied in FIG. 1a to FIG. 1f, step 407 and step 408 may be further included.

407. Receive an application response and guarantee information that are sent by the first application server.

Optionally, the first access network device may further collect information about a wireless network environment periodically, and report the network environment to the first application server periodically, so that the first application server determines the guarantee information according to the network environment and the application response.

408. Send the application response to the user equipment according to the guarantee information.

According to the method shown in FIG. 4, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved.

Figure 5:
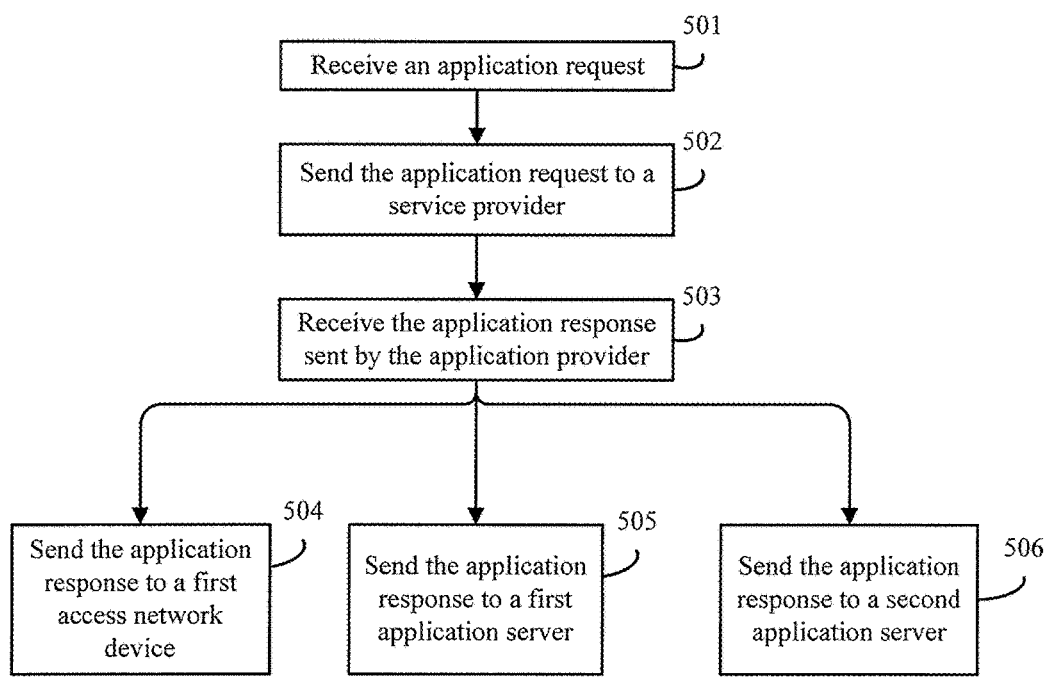
FIG. 5 is a schematic flowchart of a method for providing an application service according to an embodiment of the present invention.

FIG. 5 is a schematic flowchart of a method for providing an application service according to an embodiment of the present invention. The method in FIG. 5 may be applied to the system for providing an application service in FIG. 1b to FIG. 1f, and is executed by a core network device in the corresponding system.

501. Receive an application request, where the application request is corresponding to an application service.

Specifically, in a case in which the method in FIG. 5 is applied in FIG. 1b, or in a case in which the method in FIG. 5 is applied in FIG. 1c and a first access network device is connected to the core network device, the application request may be received from the first access network device. In a case in which the method in FIG. 5 is applied in the system in FIG. 1c or FIG. 1d the application request may be received from a first application server. In a case in which the method in FIG. 5 is applied in the system in FIG. 1e or FIG. 1f, the application request may be received from a second application server.

502. Send the application request to a service provider, so that the service provider determines an application response according to the application request, where the application response is corresponding to the application service.

503. Receive the application response sent by the service provider.

Optionally, in a case in which the method in FIG. 5 is applied in FIG. 1b, or in a case in which the method in FIG. 5 is applied in FIG. 1c and the first access network device is connected to the core network device, the method further includes step 504.

504. Send the application response to the first access network device.

Optionally, in a case in which the method in FIG. 5 is applied in the system in FIG. 1c or FIG. d, the method further includes step 505.

505. Send the application response to the first application server.

Optionally, in a case in which the method in FIG. 5 is applied in the system in FIG. 1e or FIG. 1f, the method further includes step 506.

506. Send the application response to the second application server.

According to the method shown in FIG. 5, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. However, in a case in which the application server does not provide an application service, a core network device may send an application request to an Internet service provider, so that the service provider provides an application or content service, and forward the application or content service provided by the service provider, to a user equipment.

Figure 6:
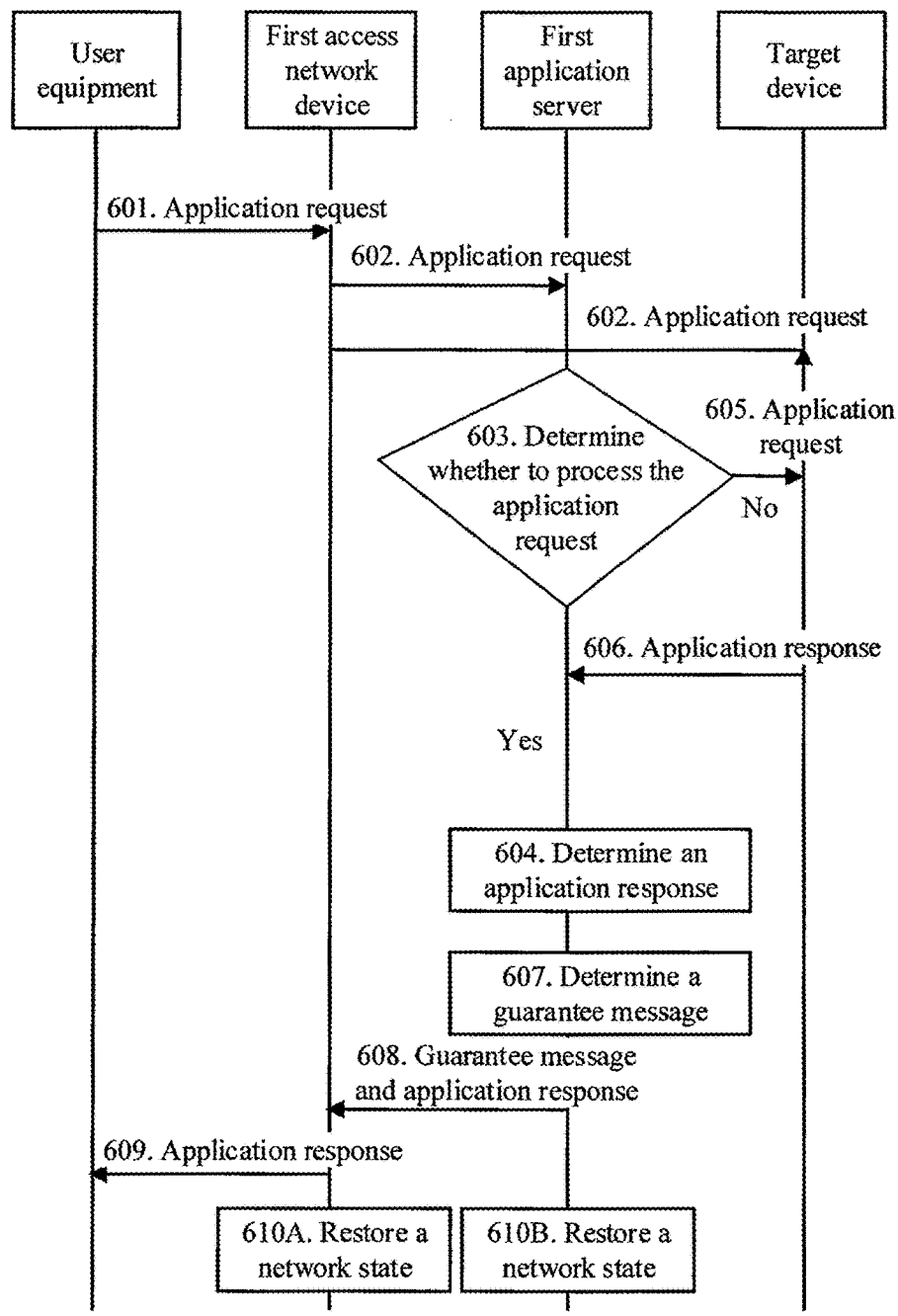
FIG. 6 is a schematic flowchart of a method for providing an application service according to an embodiment of the present invention.

FIG. 6 is a schematic flowchart of a method for providing an application service according to an embodiment of the present invention. The method in FIG. 6 is a specific embodiment of the method in FIG. 2 to FIG. 5.

601. A user equipment sends an application request to a first access network device, for requesting an application service corresponding to the application request.

602. In a case in which the first access network device receives the application request, the first access network device sends the application request to a first application server.

Optionally, in a case in which the method in FIG. 6 is applied in the system in FIG. 1b, or in a case in which the method in FIG. 6 is applied in FIG. 1c and a third interface exists between the first access network device and a core network device, the first access network device may send the application request to the first application server according to an offload policy (for example, offloading according to a user type, a service type, or the like), or may send the application request to the core network device.

603. In a case in which the first application server receives the application request, the first application server determines whether to process the application service corresponding to the application request.

604. In a case in which the first application server determines to process the application service corresponding to the application request, the first application server determines an application response according to the application request, where the application response includes content of the application service corresponding to the application request.

Optionally, in a case in which the method in FIG. 6 is applied to the system in FIG. 1c to FIG. 1f, corresponding steps in step 605 to step 610 may be executed.

605. In a case in which the first application server determines not to process the application service corresponding to the application request, the first application server sends the application request to a target device.

Optionally, in a case in which the method in FIG. 6 is applied in FIG. 1c and FIG. 1d, the target device is the core network device in the system. In a case in which the method in FIG. 6 is applied in FIG. 1e and FIG. 1f, the target device is a second application server in the system. In a case in which the method in FIG. 6 is applied in FIG. 1f, the target device is a third application server in the system or the second application server in the system.

Optionally, in a case in which the method in FIG. 6 is applied in FIG. 1c and FIG. 1d, the target device is the core network device in the system. Specifically, in a case in which the core network device receives the application request sent by the first application server, the core network device sends the application request to a service provider, so that the service provider determines an application response according to the application request, where the application response includes the content of the application service corresponding to the application request. The service provider sends the application response to the core network device. The core network device sends the application response to the first application server.

Optionally, in a case in which the method in FIG. 6 is applied in FIG. 1e and FIG. 1f, the target device is the second application server in the system. Specifically, in a case in which the second application server receives the application request sent by the first application server, the second application server determines whether to process the application service corresponding to the application request. In a case in which the second application server determines to process the application service corresponding to the application request, the second application server determines an application response according to the application request, where the application response includes the content of the application service corresponding to the application request. In a case in which the second application server determines not to process the application service corresponding to the application request, the second application server sends the application request to the core network device in the system. In a case in which the core network device receives the application request sent by the second application server, the core network device sends the application request to a service provider, so that the service provider determines an application response according to the application request, where the application response includes the content of the application service corresponding to the application request. The service provider sends the application response to the core network device. The core network device sends the application response to the second application server. In a case in which the second application server receives the application response, the second application server sends the application response to the first application server. Optionally, in a case in which the method in FIG. 6 is applied in FIG. 1e and FIG. 1f, the second application server may be further not configured to process the application request, but only configured to provide a service support processing capability and forward the application request to the core network device.

Optionally, in a case in which the method in FIG. 6 is applied in FIG. 1f, the first application server, second application server, and third application server may provide a cloud computing service, form a device cluster, and provide a distributed computation processing capability, and are configured to provide an application service. Thereby, in a case in which the first application server determines not to process the application service corresponding to the application request, the first application server may send the application request to the second application server and/or third application server, and the second application server and/or third application server determines whether to process the application service corresponding to the application request.

If the second application server and/or third application server determines to process the application service corresponding to the application request, the second application server and/or third application server determines an application response according to the application request, where the application response includes the content of the application service corresponding to the application request, and sends the application response to the first application server. In a case in which the first application server receives the application response, steps after step 606 may be executed. If the second application server and/or third application server determines not to process the application service corresponding to the application request, the second application server and/or third application server sends the application request to the service provider, so that the service provider determines an application response according to the application request.

Specifically, in a case in which the first application server determines not to process the application service corresponding to the application request, the first application server may send the application request to the third application server, or may send the application request to the second application server and third server simultaneously. In a case in which the first application server sends the application request to the third application server, the third application server determines whether to process the application service corresponding to the application request. If the third application server determines to process the application service corresponding to the application request, the third application server determines an application response according to the application request, and sends the application response to the first application server. If the third application server determines not to process the application service corresponding to the application request, the third application server may send the application request to the second application server, so that the second application server processes the application request. The second application server may process the application service corresponding to the application request. Alternatively, the second application server may send the application request to the core network device, so that the core network device sends the application request to the service provider. Thereby, the service provider may provide the application service according to the application request and send an application including the content of the application service to the core network device, and the core network device sends the application response to the second application server, so that the second application server sends the application response to the first application server. Alternatively, in a case in which the third application server determines not to process the application service corresponding to the application request, the third application server may send a negative notification to the first application server, so that the first application server sends the application request to the second application server after receiving the negative notification so that the second application server may process the application service corresponding to the application request. The second application server may further send the application request to the core network device, so that the core network device sends the application request to the service provider. Thereby, the service provider may provide the application service according to the application request and send an application including the content of the application service to the core network device, and the core network device sends the application response to the second application server, so that the second application server sends the application response to the first application server. In a case in which the first application server sends the application request to the second application server and third application server simultaneously, if neither the second application server nor the third application server processes the application service corresponding to the application request, the second application server sends the application request to the core network device, so that the core network device sends the application request to the service provider. Thereby, the service provider may provide the application service according to the application request and send an application including the content of the application service to the core network device, and the core network device sends the application response to the second application server, so that the second application server sends the application response to the first application server.

Optionally, in a case in which the method in FIG. 6 is applied in the system in FIG. 1*b*, in a case in which the first application server determines not to process the application service corresponding to the application request, the first application server may send a negative notification to the first access network device, where the negative notification is used for notifying that the first application server does not process the application service corresponding to the application request. The negative notification may be a negative message, or may be the application request. In a case in which the first access network device receives the negative notification, the first access network device sends the application request to the core network device. In a case in which the core network device receives the application request, the core network device sends the application request to the service provider, so that the service provider determines an application response according to the application request, where the application response includes the content of the application service corresponding to the application request. The service provider sends the application response to the core network device. The core network device sends the application response to the first core network device.

606. The first application server receives an application response sent by the target device.

607. The first application server determines a guarantee message according to the content of the application service in the application response and a network environment. Specifically, the first application server determines, according to the content of the application service and the network environment, whether the first access network device needs to adjust network sending scheduling, and determines the guarantee message when determining that the first access network device needs to adjust network sending scheduling.

Optionally, the application response may be determined by the first application server, or the application response may be received by the application server from the target device.

608. The first application server sends the guarantee message and the application response to the first access network device.

609. The first access network device sends the application response to the user equipment. Specifically, in a case in which the first access network device receives the guarantee message, the first access network device adjusts network sending scheduling according to the guarantee message to ensure sending of the received application response to the user equipment that sends the application request.

610A, 610B. The first access network device and the first application server restore a network state in a case in which sending of the application response is completed According to the method shown in FIG. 6, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved.

Figure 7:
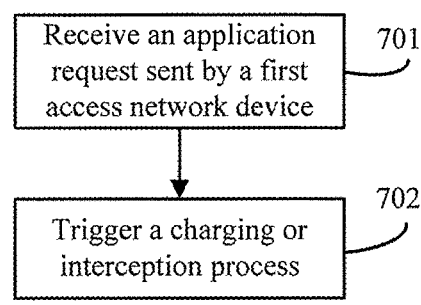
FIG. 7 is a schematic flowchart of a method for charging or interception when an application service is provided according to an embodiment of the present invention.

FIG. 7 is a schematic flowchart of a method for charging or interception when an application service is provided according to an embodiment of the present invention. The method in FIG. 7 may be used in the system in FIG. 1*a* to FIG. 1*f*. The method is executed by a first application server in a system for providing an application service.

710. Receive an application request sent by a first access network device, where the application request is received by the first access network device from a user equipment, and the application request is used for requesting an application service.

602. Trigger a charging or interception process.

According to the method shown in FIG. 7, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, the application server may further provide a charging or interception service. Therefore, in a case in which the application server may process an application request, charging and interception of an application service are also deployed on the RAN side, which may reduce burden of the core network.

Figure 8:
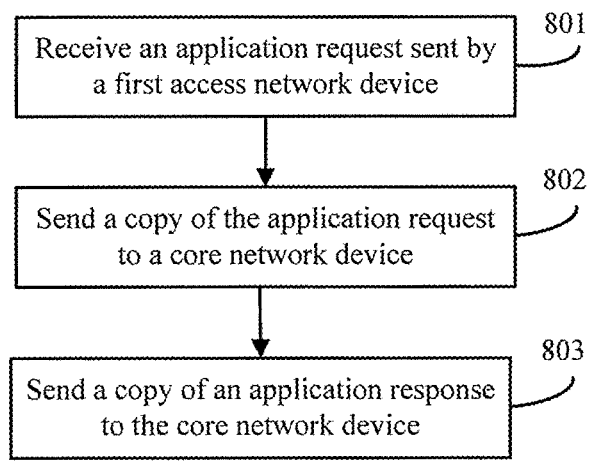
FIG. 8 is a schematic flowchart of a method for charging or interception when an application service is provided according to an embodiment of the present invention.

FIG. 8 is a schematic flowchart of a method for charging or interception when an application service is provided according to an embodiment of the present invention. The method in FIG. 8 is a specific embodiment of the method in FIG. 7. The method is executed by a first application server in a system for providing an application service.

801. Receive an application request sent by a first access network device, where the application request is received by the first access network device from a user equipment, and the application request is used for requesting an application service.

802. Send a copy of the application request to a core network device, so that the core network device starts performing charging or interception in a case in which the core network device receives the copy of the application request.

803. In a case in which an application response is sent to the user equipment, send a copy of the application response to the core network device, so that the core network device performs charging or interception, where the application response is corresponding to the application service requested by the application request, and the application response is sent by the first application server to the user equipment through the first access network device.

According to the method shown in FIG. 8, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, the application server may further provide a charging or interception service. Therefore, in a case in which the application server may process an application request, charging and interception of an application service are also deployed on the RAN side, and the application server on the RAN side controls a charging or interception process, which may reduce burden of the core network.

Figure 9:
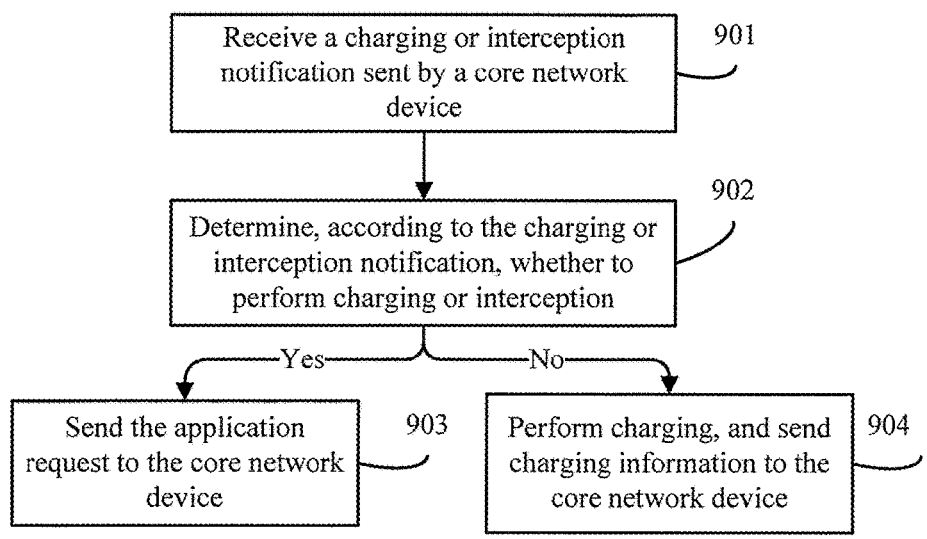
FIG. 9 is a schematic flowchart of a method for charging or interception when an application service is provided according to an embodiment of the present invention.

FIG. 9 is a schematic flowchart of a method for charging or interception when an application service is provided according to an embodiment of the present invention. The method in FIG. 9 is a specific embodiment of the method in FIG. 7. The method is executed by a first application server in a system for providing an application service.

901. Receive a charging or interception notification sent by a core network device, where the charging or interception notification is used for indicating a charging or interception rule.

902. In a case in which an application request is received, determine, according to the charging or interception notification, whether to perform charging or interception.

903. In a case in which it is determined to perform interception, skip processing an application service corresponding to the application request, and send the application request to the core network device, to instruct the core network device to start performing charging or interception.

904. In a case in which it is determined not to perform interception, process the application service corresponding to the application request, perform charging, and in a case in which an application response is sent to a user equipment, send charging information to the core network device, for notifying the core network device of a charging result.

According to the method shown in FIG. 9, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, the application server may further provide a charging or interception service. Therefore, in a case in which the application server may process an application request, charging and interception of an application service are also deployed on the RAN side, and the application server on the RAN side controls a charging or interception process, which may reduce burden of the core network.

Figure 10:
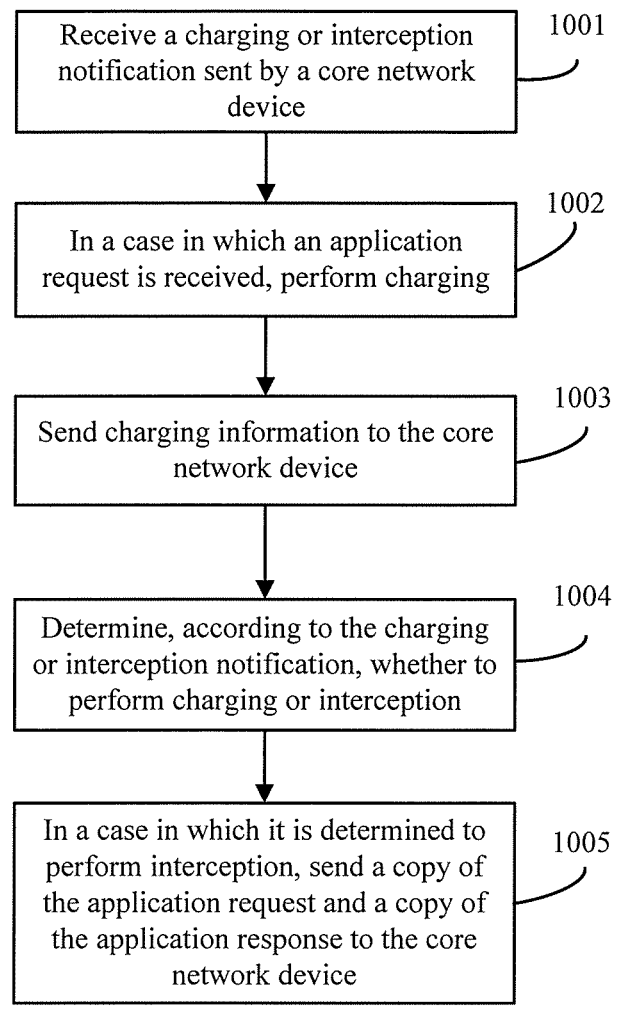
FIG. 10 is a schematic flowchart of a method for charging or interception when an application service is provided according to an embodiment of the present invention.

FIG. 10 is a schematic flowchart of a method for charging or interception when an application service is provided according to an embodiment of the present invention. The method in FIG. 10 is a specific embodiment of the method in FIG. 7. The method is executed by a first application server in a system for providing an application service.

1001. Receive a charging or interception notification sent by a core network device, where the charging or interception notification is used for indicating a charging or interception rule.

1002. In a case in which an application request is received, perform charging.

1003. In a case in which an application response is sent to a user equipment, send charging information to the core network device, for notifying the core network device of a charging result.

1004. In a case in which the charging information is sent to the core network device, determine, according to the charging or interception notification, whether to perform charging or interception.

1005. In a case in which it is determined to perform interception, send a copy of the application request and a copy of the application response to the core network device, to instruct the core network device to start performing interception.

According to the method shown in FIG. 10, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, the application server may further provide a charging or interception service. Therefore, in a case in which the application server may process an application request, charging and interception of an application service are also deployed on the RAN side, and the application server on the RAN side controls a charging or interception process, which may reduce burden of the core network.

Figure 11:
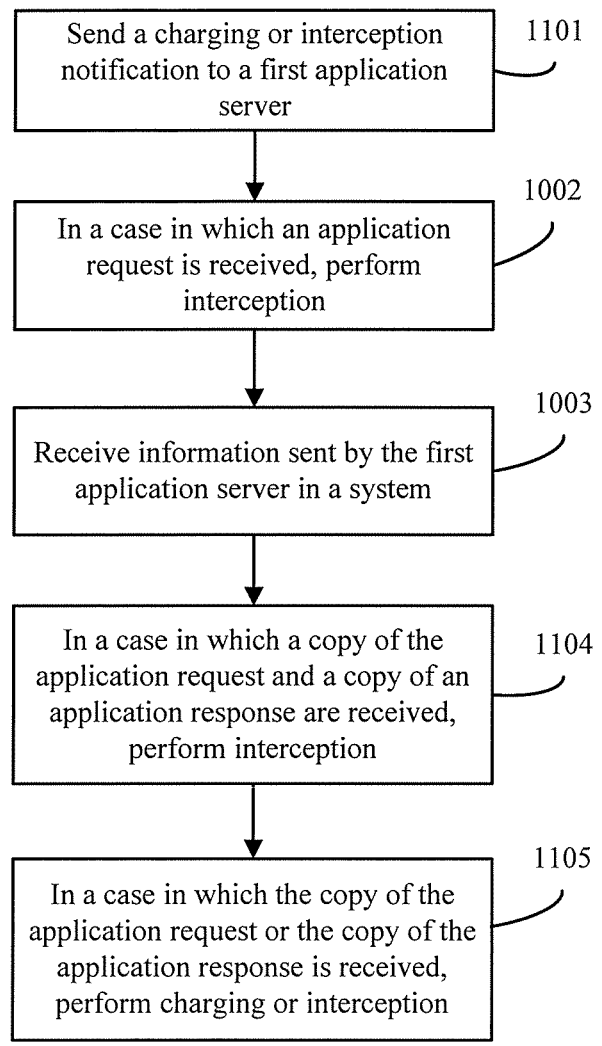
FIG. 11 is a schematic flowchart of a method for charging or interception when an application service is provided according to an embodiment of the present invention.

FIG. 11 is a schematic flowchart of a method for charging or interception when an application service is provided according to an embodiment of the present invention. The method in FIG. 11 may be applied in any one system in FIG. 1b to FIG. 1f. The method is executed by a core network device in a system for providing an application service.

1101. Send a charging or interception notification to a first application server, so that the first application server determines, according to the charging or interception notification, whether to perform charging or interception, where step 1101 is an optional step.

1102. Receive one or more pieces of the following information sent by the first application server in the system: charging information, an application request, a copy of the application request, and a copy of an application response.

1103. In a case in which the application request is received, perform interception.

1104. In a case in which the copy of the application request and the copy of the application response are received, perform interception.

1105. In a case in which the copy of the application request or the copy of the application response is received, perform charging or interception.

According to the method shown in FIG. 11, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, the application server may further provide a charging or interception service. Therefore, in a case in which the application server may process an application request, charging and interception of an application service are also deployed on the RAN side, and the application server on the RAN side controls a charging or interception process, which may reduce burden of the core network.

Figure 12:
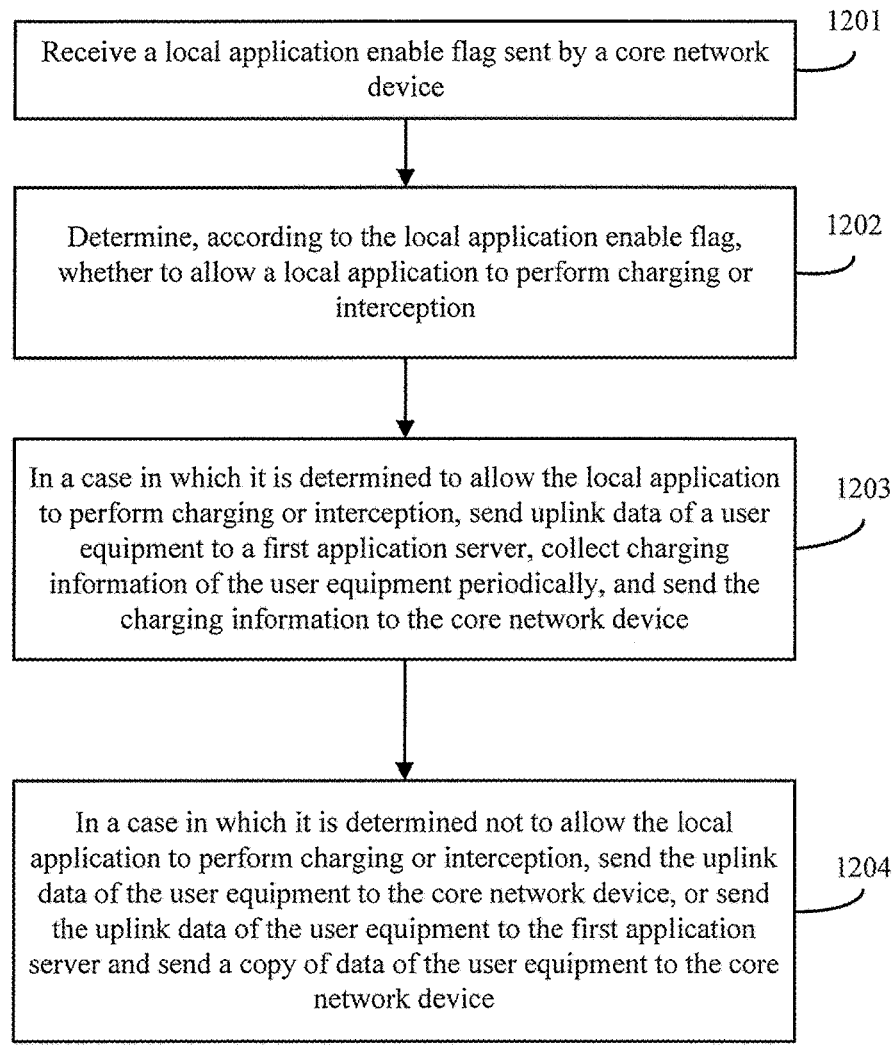
FIG. 12 is a schematic flowchart of a method for charging or interception when an application service is provided according to an embodiment of the present invention.

FIG. 12 is a schematic flowchart of a method for charging or interception when an application service is provided according to an embodiment of the present invention. The method in FIG. 12 may be applied in any one system in FIG. 1b to FIG. 1f. The method is executed by a first access network device in the system.

1201. Receive a local application enable flag sent by a core network device.

1202. Determine, according to the local application enable flag, whether to allow a local application to perform charging or interception.

1203. In a case in which it is determined to allow the local application to perform charging or interception, send uplink data of a user equipment to a first application server, collect charging information of the user equipment periodically, and send the charging information to the core network device.

1204. In a case in which it is determined not to allow the local application to perform charging or interception, send the uplink data of the user equipment to the core network device, or send data of the user equipment to the first application server and send a copy of the data of the user equipment to the core network device, where the copy of the data of the user equipment includes a copy of the uplink data (for example, includes an application request) and a copy of downlink data (for example, includes an application response) of the user equipment.

According to the method shown in FIG. 12, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, in a case in which the application server may process an application request, charging and interception of an application service are also deployed on the RAN side, and the access network device on the RAN side controls a charging or interception process, which may reduce burden of the core network.

Figure 13:
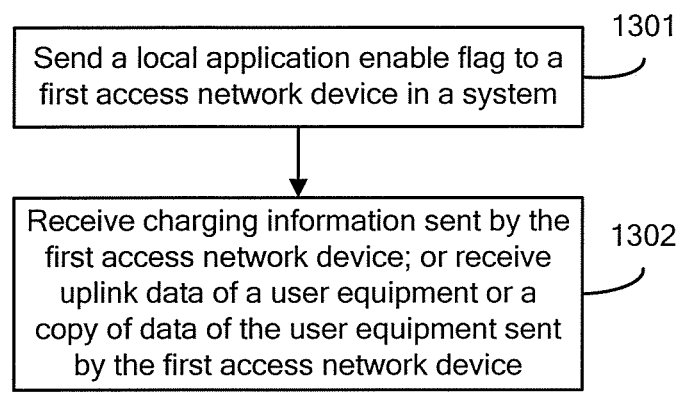
FIG. 13 is a schematic flowchart of a method for charging or interception when an application service is provided according to an embodiment of the present invention.

FIG. 13 is a schematic flowchart of a method for charging or interception when an application service is provided according to an embodiment of the present invention. The method in FIG. 13 may be applied in any one system in FIG. 1b to FIG. 1f. The method is executed by a core network device in the system.

1301. Send a local application enable flag to a first access network device in the system, so that the first access network device determines, according to the local application enable flag, whether to perform charging or interception.

1302. Receive charging information sent by the first access network device; or receive uplink data of a user equipment or a copy of data of the user equipment sent by the first access network device, where the copy of the data of the user equipment includes a copy of the uplink data (for example, includes an application request) and a copy of downlink data (for example, includes an application response) of the user equipment.

According to the method shown in FIG. 13, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, in a case in which the application server may process an application request, charging and interception of an application service are also deployed on the RAN side, and the access network device on the RAN side controls a charging or interception process, which may reduce burden of the core network.

Figure 14:
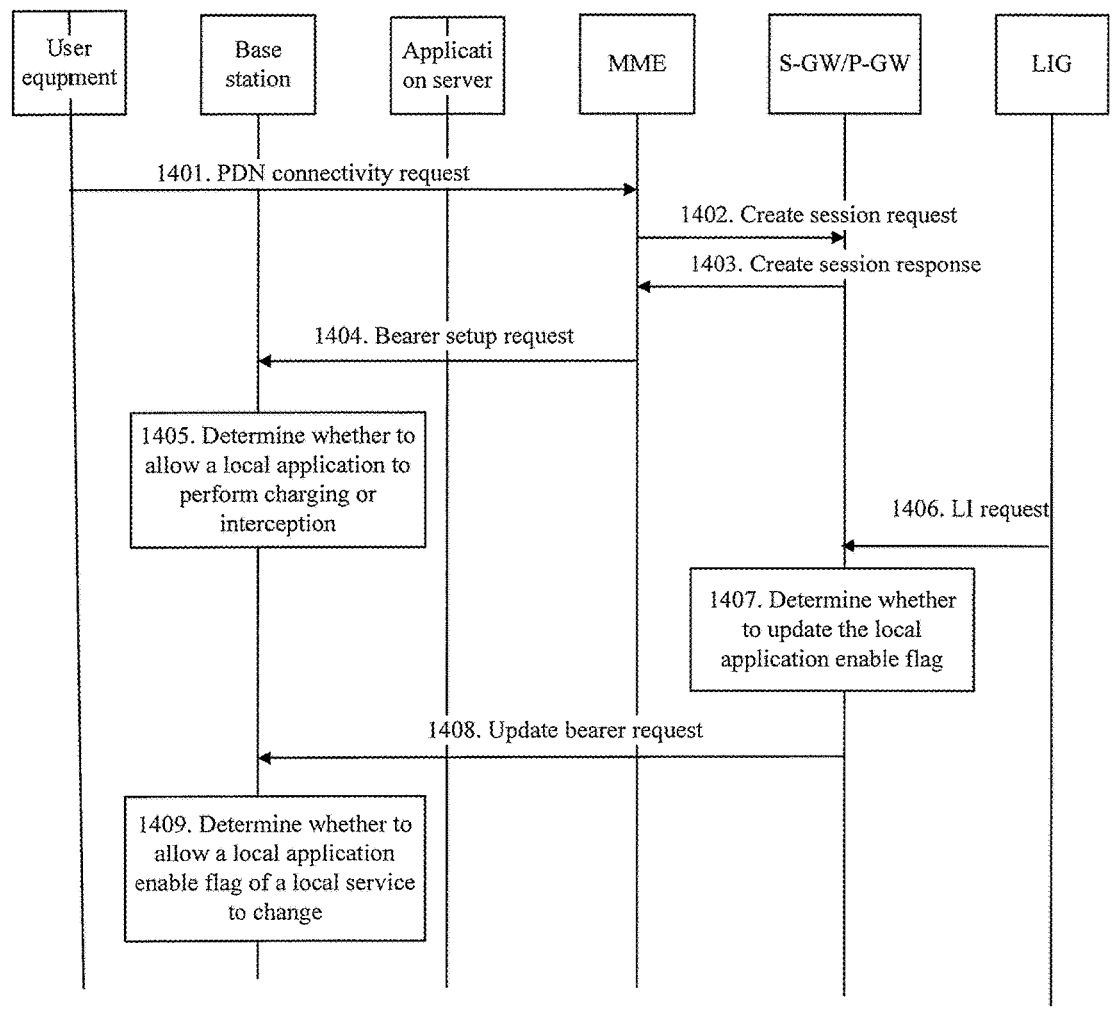
FIG. 14 is a schematic flowchart of a method for charging or interception when an application service is provided according to the present invention.

FIG. 14 is a schematic flowchart of a method for charging or interception when an application service is provided according to the present invention. The method in FIG. 14 is a specific embodiment of the method in FIG. 12 and FIG. 13, and the method in FIG. 14 is applied in an LTE network.

1401. A user equipment sends a packet data network (Packet Data Network, PDN) connectivity request (connectivity request) to a mobility management entity (Mobility Management Entity, MME).

1402. In a case in which the MME receives the PDN connectivity request, the MME sends a create session request (create session request) to a serving gateway (Serving Gateway, S-GW) or a PDN gateway (PDN gateway, P-GW).

1403. In a case in which the S-GW or P-GW receives the create session request, the S-GW or P-GW sends a create session response to the MME, where the create session response carries a local application enable (local app enable) flag, for determining whether to allow enabling a local application.

1404. In a case in which a base station receives a bearer setup request (bearer setup request) that is sent by the MME and carries the local application enable flag, the base station saves the local application enable flag.

1405. In a case in which the base station successfully sets up a radio link and receives data of the user equipment, the base station determines, according to the local application enable flag, whether to allow the local application to perform charging or interception.

Specifically, in a case in which the base station determines to allow the local application to perform charging or interception, the base station sends the data of the user equipment to a first application server, periodically collects information (such as traffic) used for charging, and reports the information to a core network device.

In a case in which the base station determines not to allow the local application to perform charging or interception, the base station may send the data of the user equipment to the core network device instead of sending the data of the user equipment to the first application server. Alternatively, the base station may send the data of the user equipment to the first application server, and send a copy of the data of the user equipment to the core network device. The core network device discards the copy of the data of the user equipment after processing the copy of the data of the user equipment.

Optionally, step 1406 to step 1409 may be further included and are used for updating the local application enable flag.

1406. A lawful interception gateway (Lawful Interception Gateway, LIG) sends an interception request message (LI request) to the S-GW or P-GW.

1407. The S-GW or P-GW determines, according to the interception request message, whether to update the local application enable flag.

1408. In a case in which the S-GW or P-GW determines to update the local application enable flag, the S-GW or P-GW sends an update bearer request (update bearer request) to the base station, where the update bearer request carries an local application flag to be updated.

1409. The base station determines, according to the update bearer request, whether to allow the local application enable flag of a local service to change, and performs an operation according to the updated local application enable flag after receiving the data of the user equipment.

According to the method shown in FIG. 14, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, in a case in which the application server may process an application request, charging and interception of an application service are also deployed on the RAN side, and the access network device on the RAN side controls a charging or interception process, which may reduce burden of the core network.

Figure 15:
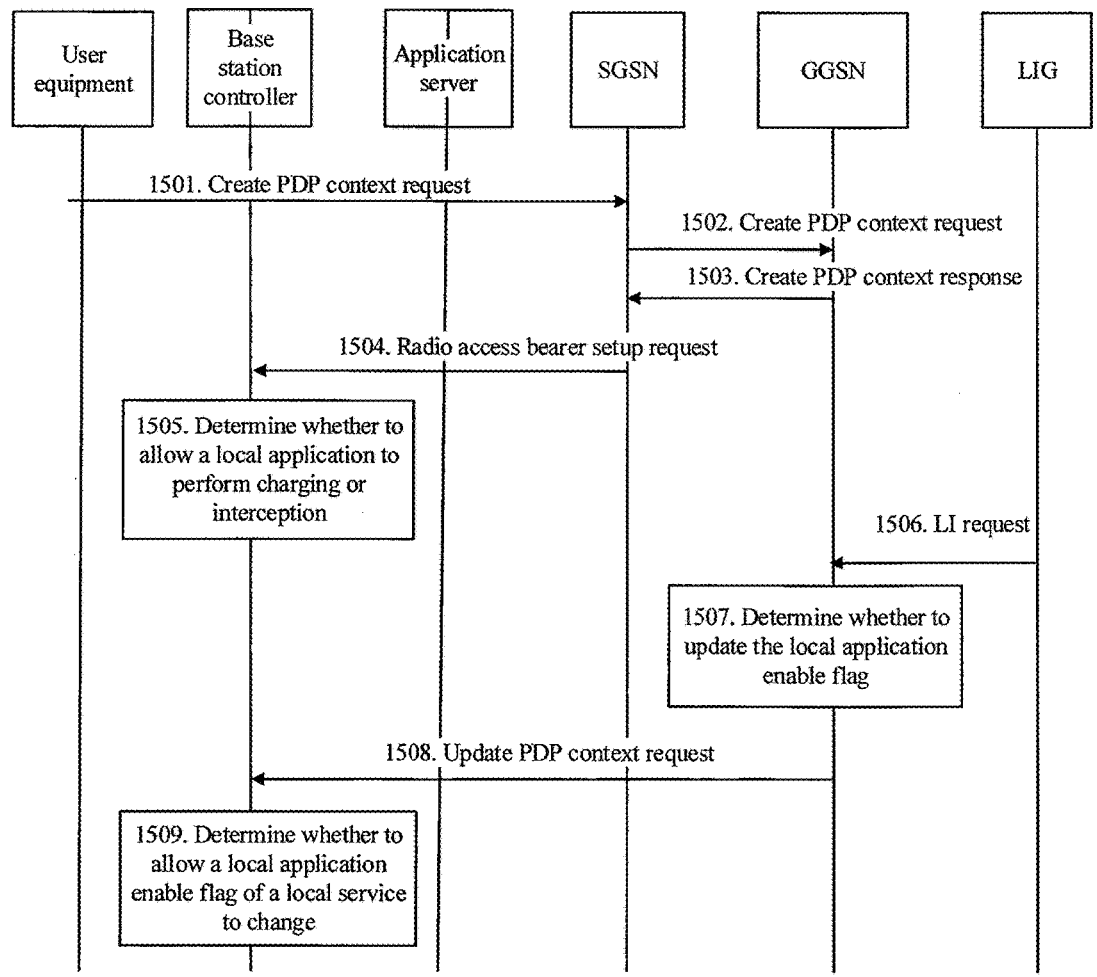
FIG. 15 is a schematic flowchart of a method for charging or interception when an application service is provided according to the present invention.

FIG. 15 is a schematic flowchart of a method for charging or interception when an application service is provided according to the present invention. The method in FIG. 15 is a specific embodiment of the method in FIG. 12 and FIG. 13, and the method in FIG. 15 is applied in a UMTS network.

1501. A user equipment sends a create Packet Data Protocol (Packet Data Protocol, PDP) context request (create PDP context request) to a serving GPRS support node (Serving GPRS Support Node, SGSN).

1502. In a case in which the SGSN receives the create PDP context request, the SGSN forwards the create PDP context request to a gateway GPRS support node (Gateway GPRS Support Node, GGSN).

1503. In a case in which the GGSN receives the create PDP context request, the GGSN sends a create PDP context response to the SGSN, where the create PDP context response carries a local application enable (local app enable) flag, for determining whether to allow enabling a local application.

1504. A base station controller receives a radio access bearer (Radio Access Bearer, RAB) assignment request (Assignment Request) that is sent by the SGSN and carries the local application enable flag, and saves the local application enable flag.

1505. In a case in which the base station controller successfully sets up a radio link and receives data of the user equipment, the base station controller determines, according to the local application enable flag, whether to allow the local application to perform charging or interception.

Specifically, in a case in which the base station controller determines to allow the local application to perform charging or interception, the base station controller sends the data of the user equipment to a first application server, periodically collects information used for charging such as traffic, and reports the information to a core network device.

In a case in which the base station controller determines not to allow the local application to perform charging or interception, the base station controller may send the data of the user equipment to the core network device instead of sending the data of the user equipment to the first application server. The base station controller may further send the data of the user equipment to the first application server, and send a copy of the data of the user equipment to the core network device. The core network device discards the copy of the data of the user equipment after processing the copy of the data of the user equipment.

Optionally, step 1506 to step 1509 may be further included and are used for updating the local application enable flag.

1506. A lawful interception gateway (Lawful Interception Gateway, LIG sends an interception request message (LI request) to the GGSN.

1507. The GGSN determines, according to the interception request message, whether to update the local application enable flag.

1508. In a case in which the GGSN determines to update the local application enable flag, the GGSN sends an update PDP context request (update PDP context request) to the base station controller, where the update PDP context request carries an local application flag to be updated.

1509. The base station controller determines, according to the update PDP context request, whether to allow the local application enable flag of a local service to change, and performs an operation according to the updated local application enable flag after receiving the data of the user equipment.

According to the method shown in FIG. 15, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, in a case in which the application server may process an application request, charging and interception of an application service are also deployed on the RAN side, and the access network device on the RAN side controls a charging or interception process, which may reduce burden of the core network.

Figure 16:
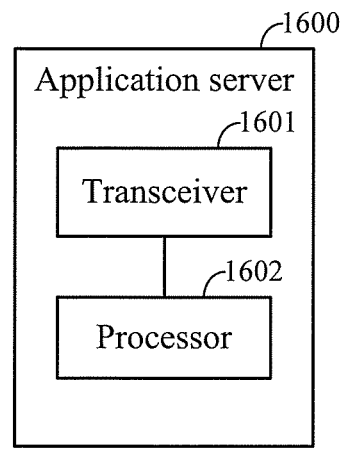
FIG. 16 is a schematic block diagram of an application server according to the present invention.

FIG. 16 is a schematic block diagram of an application server according to the present invention. The application server 1600 shown in FIG. 16 may be a first application server in any one system in FIG. 1*a* to FIG. 1*f*, and may execute each step executed by the first application server in FIG. 2 and FIG. 6. The application server 1600 includes a transceiver 1601 and a processor 1602.

The transceiver 1601 is connected to one or more first access network devices in the system through a first interface.

The transceiver 1601 is configured to receive an application request sent by the one or more first access network devices, where the application request is received by the one or more first access network devices from a user equipment.

The processor 1602 is configured to determine whether to process an application service corresponding to the application request.

The processor 1602 is further configured to determine an application response according to the application request in a case in which the processor 1602 determines to process the application service corresponding to the application request, where the application response is corresponding to the application service.

The transceiver 1601 is further configured to send the application response determined by the processor 1602 to the one or more access network devices, so that the one or more access network devices send the application response to the user equipment.

Optionally, in a case in which the application server 1600 is applied in the system in FIG. 1*c* or FIG. 1*d*, the transceiver 1601 is further connected to a core network device in the system through a second interface.

In a case in which the processor 1602 determines not to process the application request, the transceiver 1601 is further configured to send the application request to the core network device, so that the core network device sends the application request to a service provider, so that the service provider determines an application response according to the application request, where the application response is corresponding to the application service;

the transceiver 1601 is further configured to receive the application response sent by the core network device, where the application response is received by the core network device from the service provider; and the transceiver 1601 is further configured to send the application response to the one or more access network devices, so that the one or more access network devices send the application response to the user equipment.

Optionally, in a case in which the application server 1600 is applied in the system in FIG. 1*e* or FIG. 1*f*, the transceiver 1601 may be further connected to a second application server in the system through a fourth interface.

In a case in which the processor 1602 determines not to process the application request, the transceiver 1601 is further configured to send the application request to the second application server, so that the second application server acquires the application response;

the transceiver 1601 is further configured to receive the application response sent by the second application server; and the transceiver 1601 is further configured to send the application response to the one or more access network devices, so that the one or more access network devices send the application response to the user equipment.

Optionally, in a case in which the application server 1600 is applied in the system in FIG. 1*f*, the transceiver 1601 is further connected to a third application server in the system through a sixth interface, where the third application server may be the same as the first application server.

In a case in which the processor 1602 determines not to process the application request, the transceiver 1601 is further configured to send the application request to the third application server, so that the third application server acquires the application response corresponding to the application request;

the transceiver 1601 is further configured to receive the application response sent by the third application server; and the transceiver 1601 is further configured to send the application response to the one or more access network devices, so that the one or more access network devices send the application response to the user equipment.

The transceiver 1601 is further configured to receive an application request sent by the third application server.

The processor 1602 is further configured to determine whether to process an application service corresponding to the application request;

the processor 1602 is further configured to: in a case in which the processor 1602 determines to process the application service corresponding to the application request, determine, according to the application request sent by the third application server, an application response corresponding to the application request. The transceiver 1601 is further configured to send the application response to the third application server; and the transceiver 1601 is further configured to send a negative notification to the third application server in a case in which the processor 1602 determines not to process the application service corresponding to the application request, wherein the negative notification is used for notifying the third application server that the application server 1600 does not process the application service corresponding to the application request.

Optionally, the processor 1602 determines guarantee information according to the application response and a network environment;

the transceiver 1601 is further configured to send the guarantee information to the one or more first access network devices, where the guarantee message is used for instructing the first access network device to guarantee sending of the application response; and the processor 1602 is further configured to determine to restore a network state in a case in which the transceiver completes sending of the guarantee message and the application response.

Optionally, in a case in which the application server 1600 is applied in the system in FIG. 1*b*, in a case in which the transceiver is connected to one access network device in the system through the first interface, the one access network device is connected to a core network device in the system through a third interface, and the processor determines not to process the application request, the transceiver 1601 is further configured to send a negative notification to the at least one first access network device, for notifying the first access network device that the application server 1600 does not process the application service corresponding to the application request.

Optionally, in a case in which the application server 1600 is applied in any one system in FIG. 1*c* to FIG. 1*f*, the processor 1602 is further configured to perform General Packet Radio Service GPRS Tunneling Protocol-User plane GTP-U decapsulation on information received by the transceiver 1601, and perform GTP-U encapsulation on information sent by the transceiver 1601.

According to the application server 1600 shown in FIG. 16, the application server 1600 for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved.

Figure 17:
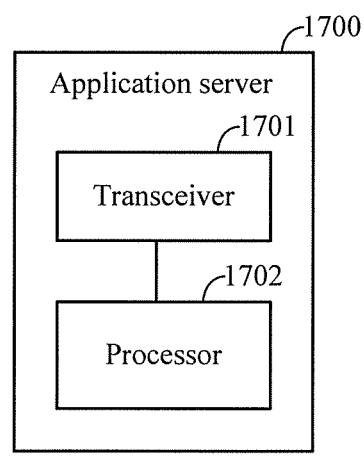
FIG. 17 is a schematic block diagram of an application server according to an embodiment of the present invention.

FIG. 17 is a schematic block diagram of an application server according to an embodiment of the present invention. The application server 1700 shown in FIG. 17 may be a second application server in the system for providing an application service in FIG. 1e or FIG. 1f, and the application server 1700 may execute each step executed by a second application server in FIG. 3 and FIG. 6. The application server 1700 includes a transceiver 1701 and a processor 1702.

The transceiver 1701 is connected to a first application server in the system through a fourth interface, and the transceiver 1701 is connected to a core network in the system through a fifth interface.

The transceiver 1701 is configured to receive an application request sent by the first application server.

The processor 1702 is configured to determine whether to process an application service corresponding to the application request.

Optionally, the processor 1702 is further configured to determine an application response according to the application request in a case in which the processor 1702 determines to process the application request, where the application response is corresponding to the application service; and the transceiver 1701 is further configured to send the application response to the first application server.

Optionally, in a case in which the processor 1702 determines not to process the application service corresponding to the application request, the transceiver 1701 is further configured to send the application request to the core network device, so that the core network device sends the application request to a service provider, so that the service provider determines an application response according to the application request, where the application response is corresponding to the application service. The transceiver 1701 is further configured to receive the application response sent by the core network device, where the application response is received by the core network device from the service provider. The transceiver 1701 is further configured to send the application response to the first application server.

According to the application server 1700 shown in FIG. 17, the application server 1700 may provide an application service for a user equipment in a case in which a first application server is not capable of providing the application service for the user equipment. Therefore, a capability of processing an application request on an RAN side by the application server can be improved, and thereby workload of a core network device may be reduced.

Figure 18:
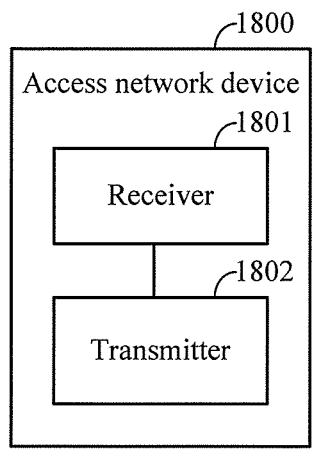
FIG. 18 is a schematic block diagram of an access network device according to an embodiment of the present invention.

FIG. 18 is a schematic block diagram of an access network device according to an embodiment of the present invention. The access network device 1800 shown in FIG. 18 may be a first access network device in any one system in FIG. 1a to FIG. 1f. The access network device 1800 may also be a second access network device in FIG. 1d or FIG. 1f. The access network device 1800 may execute each step executed by a first access network device in FIG. 4 or FIG. 6. The access network device 1800 includes a receiver 1801 and a transmitter 1802.

The receiver 1801 is connected to a first application server in the system through a first interface, and the transmitter 1802 is connected to the first application server in the system through the first interface.

The receiver 1801 is configured to receive an application request sent by a user equipment.

The transmitter 1802 is configured to send the application request to the first application server.

The receiver 1801 is further configured to receive an application response and guarantee information that are sent by the first application server.

The transmitter 1802 is further configured to send the application response to the user equipment according to the guarantee information.

Optionally, in a case in which the access network device 1800 is applied in the system in FIG. 1c, the receiver 1801 is further connected to a core network device in the system through a third interface, and the transmitter 1802 is further connected to the core network device through the third interface.

The transmitter 1802 is specifically configured to send the application request to the first application server according to an offload policy.

The transmitter 1802 is further configured to send the application request to the core network device according to the offload policy.

The receiver 1801 is further configured to receive a negative notification sent by the first application server, where the negative notification is used for notifying the first access network device that the application server is not capable of processing an application service corresponding to the application request.

The transmitter 1802 is further configured to send the application request to the core network device in a case in which the receiver 1801 receives the negative notification.

The receiver 1801 is further configured to receive an application response that is sent by the core network device.

The transmitter 1802 is further configured to send the application response to the user equipment.

Optionally, the access network device 1800 may be a base station or may be a base station controller.

According to the access network device 1800 shown in FIG. 18, an application server for providing content and application services is deployed on an RAN by connecting the application server to the access network device 1800. Because the application server may acquire information about a wireless network environment, network sending scheduling may be adjusted according to the network environment, which guarantees sending of service content and improves user experience. In addition, because the application server is deployed on the RAN, resources from the RAN to a core network may be saved.

Figure 19:
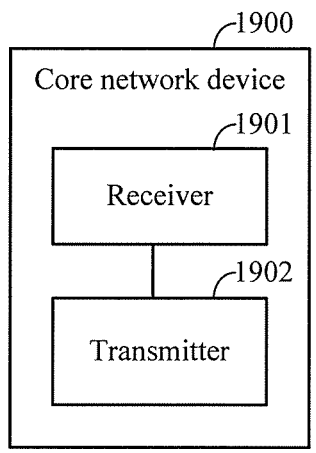
FIG. 19 is a schematic block diagram of a core network device according to the present invention.

FIG. 19 is a schematic block diagram of a core network device according to the present invention. The core network device 1900 shown in FIG. 19 may be a core network device in any one system in FIG. 1b to FIG. 1f, and the core network device 1900 may execute each step executed by a core network device in FIG. 5 or FIG. 6. The core device 1900 includes a receiver 1901 and a transmitter 1902.

The receiver 1901 is configured to receive an application request, where the application request is sent by a user equipment and used for requesting an application service.

The transmitter 1902 is configured to send the application request to a service provider, so that the service provider determines an application response according to the application request, where the application response is corresponding to the application service.

The receiver 1901 is further configured to receive the application response sent by the service provider.

Optionally, in a case in which the core network device 1900 is applied in the system shown in FIG. 1c, in a case in which the receiver 1901 is connected, through a second interface, to a first application server in the system for providing an application service, and the transmitter 1902 is connected to the first application server through the second interface, the receiver 1901 is specifically configured to receive the application request sent by the first application server, and the transmitter 1902 is further configured to send the application response to the first application server.

Optionally, in a case in which the core network device 1900 is applied in the system shown in FIG. 1e or FIG. 1f, in a case in which the receiver 1901 is connected, through a fifth interface, to a second application server in the system for providing an application service, and the transmitter 1902 is connected to the second application server through the fifth interface, the receiver 1901 is specifically configured to receive the application request sent by the second application server, and the transmitter 1902 is further configured to send the application response to the second application server.

Optionally, in a case in which the core network device 1900 is applied in the system shown in FIG. 1*b*, in a case in which the receiver 1901 is connected, through a third interface, to a first access network device in the system for providing an application service, and the transmitter 1902 is connected to the first access network device through the third interface, the receiver 1901 is specifically configured to receive the application request sent by the first access network device, and the transmitter 1902 is further configured to send the application response to the first access network device.

According to the core network device 1900 shown in FIG. 19, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN, resources from the RAN to a core network may be saved. However, in a case in which the application server does not provide an application service, the core network device 1900 may send an application request to an Internet service provider, so that the service provider provides an application or content service, and forward the application or content service provided by the service provider, to a user equipment.

The application server 1600 shown in FIG. 16 may further execute each step executed by a first application server in FIG. 7 to FIG. 10, FIG. 14, or FIG. 15.

The transceiver 1601 is configured to receive an application request sent by the first access network device, where the application request is received by the first access network device from a user equipment, and the application request is corresponding to an application service.

The processor 1602 is configured to acquire an application response, where the application response is corresponding to the application service.

The processor 1602 is further configured to control a charging or interception process.

Optionally, that the processor 1602 is further configured to control a charging or interception process includes that: the processor 1602 is specifically configured to send a copy of the application request to a core network device in the system through the transceiver, to instruct the core network device to start performing charging or interception. The processor 1602 is specifically configured to send a copy of the application response to the core network device through the transceiver, to instruct the core network device to perform charging or interception.

Optionally, the transceiver 1601 is further configured to receive a charging or interception notification sent by the core network device, where the charging or interception notification is used for indicating charging or interception.

Optionally, that the processor 1602 is configured to control a charging or interception process includes that: the processor 1602 is configured to determine whether to perform charging or interception according to the charging or interception notification. The processor 1602 is further configured to: in a case in which the processor 1602 determines to perform interception, skip processing the application service corresponding to the application request, and send the application request to the core network device in the system through the transceiver 1601, to instruct the core network to start charging or interception. The processor 1602 is further configured to: in a case in which the processor 1602 determines not to perform interception, process the application service corresponding to the application request, perform charging, and send charging information to the core network device through the transceiver 1601, for notifying the core network device of a charging result.

Optionally, that the processor 1602 is configured to control a charging or interception process includes that: the processor 1602 is configured to perform charging, and send charging information to the core network device through the transceiver 1601, for notifying the core network device of a charging result. The processor 1602 is further configured to determine, according to the charging or interception notification, whether to perform charging or interception. The processor 1602 is further configured to: in a case in which the processor 1602 determines to perform interception, send a copy of the application request and a copy of the application response to the core network device through the transceiver 1601, to instruct the core network device to perform interception.

According to the application server 1600 shown in FIG. 16, the application server 1600 for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, the application server may further provide a charging or interception service. Therefore, in a case in which the application server 1600 may process an application request, charging and interception of an application service are also deployed on the RAN side, and the application server 1600 controls a charging or interception process, which may reduce burden of the core network.

Figure 20:
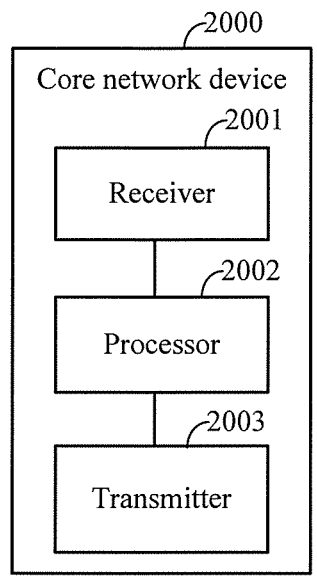
FIG. 20 is a schematic block diagram of a core network device according to the present invention.

FIG. 20 is a schematic block diagram of a core network device according to the present invention. The core network device 2000 shown in FIG. 20 may be a core network device in any one system in FIG. 1*c* to FIG. 1*f*, and the core network device 2000 may execute each step executed by a core network device in FIG. 11. The core network device 2000 includes a receiver 2001 and a processor 2002.

The receiver 2001 is configured to receive one or more pieces of the following information sent by a first application server in the system: charging information, an application request, a copy of the application request, and a copy of an application response.

The processor 2002 is configured to perform charging or interception.

The processor 2002 is specifically configured to perform interception in a case in which the receiver 2001 receives the application request.

The processor 2002 is specifically configured to perform interception in a case in which the receiver 2001 receives the copy of the application request and the copy of the application response.

The processor 2002 is specifically configured to perform charging or interception in a case in which the receiver 2001 receives the copy of the application request or the copy of the application response.

Optionally, the core network device 2000 further includes a transmitter 2003, where the transmitter 2003 is configured to send a charging or interception notification to the first application server, so that the first application server determines, according to the charging or interception notification, whether to perform charging or interception.

According to the core network device shown in FIG. 20, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, in a case in which the application server may process an application request, charging and interception of an application service are also deployed on the RAN side, and the application server on the RAN side controls a charging or interception process, which may reduce burden of the core network.

Figure 21:
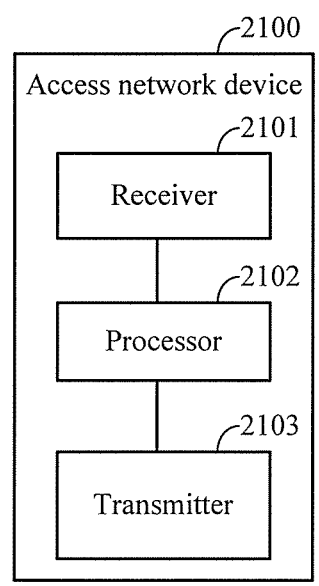
FIG. 21 is a schematic block diagram of an access network device according to the present invention.

FIG. 21 is a schematic block diagram of an access network device according to the present invention. The access network device 2100 shown in FIG. 21 may be a first access network device in any one system in FIG. 1c to FIG. 1f, and the access network device 2100 may execute each step executed by a first access network device in FIG. 12, FIG. 14, or FIG. 15. The access network device 2100 includes a receiver 2101, a processor 2102, and a transmitter 2103.

The receiver 2101 is connected to a first application server through a first interface.

The receiver 2101 is configured to receive a local application enable flag sent by a core network device in the system.

The processor 2102 is configured to determine, according to the local application enable flag, whether to allow a local application to perform charging or interception.

In a case in which the processor 2102 determines to allow using the local application to perform charging or interception, the transmitter 2103 is configured to send uplink data of a user equipment to the first application server in a case in which the processor 2102 determines to allow using the local application, the processor 2102 is further configured to collect charging information of the user equipment periodically, and the transmitter 2103 is further configured to send the charging information to the core network device.

In a case in which the processor 2102 determines not to allow the local application to perform charging or interception, the transmitter 2103 is further configured to send the uplink data of the user equipment to the core network device, or the transmitter 2103 is further configured to send the uplink data of the user equipment to the first application server and send a copy of data of the user equipment to the core network device, where the copy of the data of the user equipment includes a copy of the uplink data (for example, includes an application request) and a copy of downlink data (for example, includes an application response) of the user equipment.

According to the access network device 2100 shown in FIG. 21, an application server for providing content and application services is deployed on an RAN by connecting the application server to the access network device 2100. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, in a case in which the application server may process an application request, charging and interception of an application service are also deployed on the RAN side, and the access network device 2100 on the RAN side controls a charging or interception process, which may reduce burden of the core network.

Figure 22:
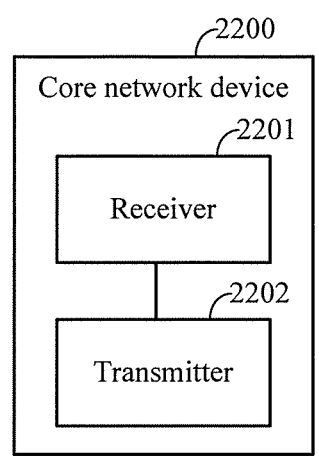
FIG. 22 is a schematic block diagram of a core network device according to the present invention.

FIG. 22 is a schematic block diagram of a core network device according to the present invention. The core network device 2200 shown in FIG. 22 may be a core network device in any one system in FIG. 1c to FIG. 1f, and the core network device 2200 may execute each step executed by a core network device in FIG. 13 to FIG. 15. The core network device 2200 includes a receiver 2201 and a transmitter 2202.

The transmitter 2202 is configured to send a local application enable flag to a first access network device in the system, so that the first access network device determines, according to the local application enable flag, whether to perform charging or interception.

The receiver 2201 is configured to receive charging information sent by the first access network device; or the receiver 2201 is configured to receive uplink data of a user equipment or a copy of data of the user equipment sent by the first access network device, where the copy of the data of the user equipment includes a copy of the uplink data (for example, includes an application request) and a copy of downlink data (for example, includes an application response) of the user equipment.

According to the core network device shown in FIG. 22, an application server for providing content and application services is deployed on an RAN by connecting the application server to an access network device. Because the application server may acquire information about a wireless network environment, network sending scheduling may be adjusted according to the network environment, which guarantees sending of service content and improves user experience. In addition, because the application server is deployed on the RAN side, resources from the RAN to a core network may be saved. In addition, in a case in which the application server may process an application request, charging and interception of an application service are also deployed on the RAN side, and the access network device on the RAN side controls a charging or interception process, which may reduce burden of the core network.

An embodiment of the present invention provides an application server, where the application server is a first application server in a system for providing an application service and includes:

a communication unit and a control unit, where:

the communication unit is connected to one or more first access network devices in the system through a first interface;

the communication unit is configured to receive an application request sent by the one or more first access network devices, where the application request is received by the one or more first access network devices from a user equipment;

the control unit is configured to determine whether to process an application service corresponding to the application request;

the control unit is further configured to determine an application response according to the application request in a case in which the control unit determines to process the application service corresponding to the application request, where the application response is corresponding to the application service; and the communication unit is further configured to send the application response determined by the control unit to the one or more access network devices, so that the one or more access network devices send the application response to the user equipment.

The communication unit may be further connected to a core network device in the system through a second interface;

in a case in which the control unit determines not to process the application request, the communication unit is further configured to send the application request to the core network device, so that the core network device sends the application request to a service provider, so that the service provider determines an application response according to the application request, where the application response is corresponding to the application service;

the communication unit is further configured to receive the application response sent by the core network device, where the application response is received by the core network device from the service provider; and the communication unit is further configured to send the application response to the one or more access network devices, so that the one or more access network devices send the application response to the user equipment.

The communication unit may be further connected to a second application server in the system through a fourth interface;

in a case in which the control unit determines not to process the application request, the communication unit is further configured to send the application request to the second application server, so that the second application server acquires the application response;

the communication unit is further configured to receive the application response sent by the second application server; and the communication unit is further configured to send the application response to the one or more access network devices, so that the one or more access network devices send the application response to the user equipment.

The communication unit may be further connected to a third application server in the system through a sixth interface;

in a case in which the control unit determines not to process the application request, the communication unit is further configured to send the application request to the second application server, so that the second application server acquires the application response;

the communication unit is further configured to receive the application response sent by the second application server; and the communication unit is further configured to send the application response to the one or more access network devices, so that the one or more access network devices send the application response to the user equipment.

The communication unit is further configured to receive an application request sent by the third application server;

the control unit is further configured to determine whether to process the application request sent by the third application server;

the control unit is further configured to: in a case in which the control unit determines to process the application request sent by the third application server, determine, according to the application request sent by the third application server, an application response corresponding to the application request sent by the third application server;

the communication unit is further configured to send, to the third application server, the application response corresponding to the application request sent by the third application server;

the communication unit is further configured to send a negative notification to the third application server in a case in which the control unit determines not to process the application request sent by the third application server, wherein the negative notification is used for notifying the third application server that the control unit determines not to process the application request sent by the third application server.

The control unit is further configured to determine guarantee information according to the application response and a network environment;

the communication unit is further configured to send the guarantee information to the one or more first access network devices, where the guarantee message is used for instructing the first access network device to guarantee sending of the application response; and the control unit is further configured to determine to restore a network state in a case in which the communication unit completes sending of the guarantee message and the application response.

In a case in which the communication unit is connected to one access network device in the system through the first interface, the one access network device is connected to the core network device in the system through a third interface, and the control unit determines not to process the application request, the communication unit is further configured to send a negative notification to the at least one first access network device, for notifying the first access network device that the application server is not capable of processing the application service corresponding to the application request.

The control unit is further configured to perform GPRS Tunneling Protocol-User plane GTP-U decapsulation on information received by the communication unit, and perform GTP-U encapsulation on information sent by the communication unit.

An embodiment of the present invention provides an application server, where the application server is each second application server in a system for providing an application service and includes:

a communication unit and a control unit, where:

the communication unit is connected to a first application server in the system through a fourth interface, and the communication unit is connected to a core network in the system through a fifth interface;

the communication unit is configured to receive an application request sent by the first application server;

the control unit is configured to determine whether to process an application service corresponding to the application request;

the control unit is further configured to determine an application response according to the application request in a case in which the control unit determines to process the application request, where the application response is corresponding to the application service; and the communication unit is further configured to send the application response to the first application server.

In a case in which the control unit determines not to process the application service corresponding to the application request, the communication unit is further configured to send the application request to the core network device, so that the core network device sends the application request to a service provider, so that the service provider determines an application response according to the application request, where the application response is corresponding to the application service;

the communication unit is further configured to receive the application response sent by the core network device, where the application response is received by the core network device from the service provider; and the communication unit is further configured to send the application response to the first application server.

An embodiment of the present invention provides an access network device, where the access network device is a first access network device in a system for providing an application service and includes:

a receiving unit and a sending unit, where:

the receiving unit is connected to a first application server in the system through a first interface, and the sending unit is connected to the first application server in the system through the first interface;

the receiving unit is configured to receive an application request sent by a user equipment; and the sending unit is configured to send the application request to the first application server.

The receiving unit may be further connected to a core network device in the system through a third interface, and the sending unit may be further connected to the core network device through the third interface;

the sending unit is specifically configured to send the application request to the first application server according to an offload policy;

the sending unit is further configured to send the application request to the core network device according to the offload policy;

The receiving unit is further configured to receive a negative notification sent by the first application server, where the negative notification is used for notifying the first access network device that the application server is not capable of processing an application service corresponding to the application request;

the sending unit is further configured to send the application request to the core network device in a case in which the receiving unit receives the negative notification.

The receiving unit is further configured to receive an application response and guarantee information that are sent by the first application server;

the sending unit is further configured to send the application response to the user equipment according to the guarantee information;

the receiving unit is further configured to receive an application response sent by the core network device;

the sending unit is further configured to send the application response to the user equipment.

An embodiment of the present invention provides a core network device, where the core network device is a core network device in a system for providing an application service and includes:

a receiving unit and a sending unit, where:

the receiving unit is configured to receive an application request, where the application request is corresponding to an application service;

the sending unit is configured to send the application request to a service provider, so that the service provider determines an application response according to the application request, where the application response is corresponding to the application service; and the receiving unit is further configured to receive the application response sent by the service provider.

In a case in which the receiving unit is connected, through a second interface, to a first application server in the system for providing an application service, and the sending unit is connected to the first application server through the second interface, the receiving unit is specifically configured to receive the application request sent by the first application server, and the sending unit is further configured to send the application response to the first application server;

in a case in which the receiving unit is connected, through a fifth interface, to a second application server in the system for providing an application service, and the sending unit is connected to the second application server through the fifth interface, the receiving unit is specifically configured to receive the application request sent by the second application server, and the sending unit is further configured to send the application response to the second application server;

in a case in which the receiving unit is connected, through a third interface, to a first access network device in the system for providing an application service, and the sending unit is connected to the first access network device through the third interface, the receiving unit is specifically configured to receive the application request sent by the first access network device, and the sending unit is further configured to send the application response to the first access network device.

An embodiment of the present invention provides an application server, where the application server is a first application server in a system for providing an application service and includes:

a communication unit and a control unit, where:

the communication unit is configured to receive an application request sent by a first access network device, where the application request is received by the first access network device from a user equipment, and the application request is corresponding to an application service;

the control unit is configured to acquire an application response, where the application response is corresponding to the application service; and the control unit is further configured to control a charging or interception process.

That the control unit is configured to control a charging or interception process includes that:

the control unit is specifically configured to send a copy of the application request to a core network device in the system through the communication unit, to instruct the core network device to start performing charging or interception; and the control unit is specifically configured to send a copy of the application response to the core network device through the communication unit, to instruct the core network device to perform charging or interception.

The communication unit is further configured to receive a charging or interception notification sent by the core network device, where the charging or interception notification is used for indicating charging or interception.

That the control unit is configured to control a charging or interception process includes that:

the control unit is configured to determine, according to the charging or interception notification, whether to perform charging or interception;

the control unit is further configured to: in a case in which the control unit determines to perform interception, skip processing the application service corresponding to the application request, and send the application request to the core network device in the system through the communication unit, to instruct the core network to start charging or interception; and the control unit is further configured to: in a case in which the control unit determines not to perform interception, process the application service corresponding to the application request, perform charging, and send charging information to the core network device through the communication unit, for notifying the core network device of a charging result.

That the control unit is configured to control a charging or interception process includes that:

the control unit is configured to perform charging, and send charging information to the core network device through the communication unit, for notifying the core network device of a charging result;

the control unit is further configured to determine, according to the charging or interception notification, whether to perform charging or interception; and the control unit is further configured to: in a case in which the control unit determines to perform interception, send a copy of the application request and a copy of the application response to the core network device through the communication unit, to instruct the core network device to perform interception.

An embodiment of the present invention provides a core network device, where the core network device is a core network device in a system for providing an application service and includes:

a receiving unit and a control unit, where:

the receiving unit is configured to receive one or more pieces of the following information sent by a first application server in the system: charging information, an application request, a copy of the application request, and a copy of an application response; and the control unit is configured to perform charging or interception.

The control unit is specifically configured to perform interception in a case in which the receiving unit receives the application request;

the control unit is specifically configured to perform interception in a case in which the receiving unit receives the copy of the application request and the copy of the application response;

the control unit is specifically configured to perform charging or interception in a case in which the receiving unit receives the copy of the application request or the copy of the application response.

The core network device further includes a sending unit, where the sending unit is configured to send a charging or interception notification to the first application server, so that the first application server determines, according to the charging or interception notification, whether to perform charging or interception.

An embodiment of the present invention provides an access network device, where the access network device is a first access network device in a system for providing an application service and includes:

a receiving unit, a control unit, and a sending unit, where:

the receiving unit is connected to a first application server through a first interface, and the sending unit is connected to the first application server through the first interface;

the receiving unit is configured to receive a local application enable flag sent by a core network device in the system;

the control unit is configured to determine, according to the local application enable flag, whether to allow a local application to perform charging or interception; and in a case in which the control unit determines to allow using the local application to perform charging or interception, the sending unit is configured to send uplink data of a user equipment to the first application server in a case in which the control unit determines to allow using the local application, the control unit is further configured to collect charging information of the user equipment periodically, and the sending unit is further configured to send the charging information to the core network device; or in a case in which the control unit determines not to allow the local application to perform charging or interception, the sending unit is configured to send the uplink data of the user equipment to the core network device, or the sending unit is further configured to send the uplink data of the user equipment to the first application server and send a copy of data of the user equipment to the core network device, where the copy of the data of the user equipment includes a copy of the uplink data (for example, includes an application request) and a copy of downlink data (for example, includes an application response) of the user equipment.

An embodiment of the present invention provides a core network device, where the core network device is a core network device in a system for providing an application service and includes:

a receiving unit and a sending unit, where:

the sending unit is configured to send a local application enable flag to a first access network device in the system, so that the first access network device determines, according to the local application enable flag, whether to perform charging or interception; and the receiving unit is configured to receive charging information sent by the first access network device; or the receiving unit is configured to receive uplink data of a user equipment or a copy of data of the user equipment sent by the first access network device, where the copy of the data of the user equipment includes a copy of the uplink data (for example, includes an application request) and a copy of downlink data (for example, includes an application response) of the user equipment.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for providing an application service, wherein the method is configured for execution by a first application server in a system for providing the application service, wherein the first application server is connected to a first access network device in the system, the method comprising:
  receiving an application request sent by the first access network device, wherein the application request is received by the first access network device from a user equipment;
  determining whether to process the application service corresponding to the application request;
  when it is determined to process the application service corresponding to the application request:
    determining an application response according to the application request, and
    sending the application response to the first access network device, so that the first access network device sends the application response to the user equipment; and
  when it is determined not to process the application service corresponding to the application request:
    sending a negative notification to the first access network device, wherein the negative notification is used for notifying the first access network device that the first application server is not capable of processing the application service corresponding to the application request;
    determining a guarantee message according to the application response and a network environment, wherein the guarantee message is used for instructing the first access network device to guarantee sending of the application response;
    when the application response is sent to the first access network device, sending the guarantee message to the first access network device, so that the first access network device sends the application response to the user equipment according to the guarantee message; and
    when sending of the application response is completed, restoring a network state.

2. A method for providing an application service, wherein the method is configured for execution by a second application server in a system for providing the application service, wherein the second application server is connected to a first application server in the system, and the second application server is further connected to a core network device in the system, the method comprising:
  receiving an application request sent by the first application server;
  determining whether to process the application service corresponding to the application request;
  when it is determined to process the application service corresponding to the application request:
    determining an application response according to the application request, wherein the application response is corresponding to the application service, and
    sending the application response to the first application server; and
  when it is determined not to process the application service corresponding to the application request:
    sending a negative notification to the first application server, wherein the first application server sends the negative notification to the first access network device, wherein the negative notification is used for notifying the first access network device that the second application server is not capable of processing the application service corresponding to the application request;
    determine a guarantee message according to the application response and a network environment, wherein the guarantee message is used for instructing a first access network device to guarantee sending of the application response;
    when the application response is sent to the first access network device, sending the guarantee message to the first access network device, so that the first access network device sends the application response to user equipment according to the guarantee message; and when sending of the application response is completed, restoring a network state.

3. A method for providing an application service, wherein:
the method is executed by a first access network device in a system for providing the application service, and the first access network device is connected to a first application server in the system; and
the method comprises:
  receiving an application request sent by a user equipment,
  sending the application request to the first application server,
  when the first access network device is further connected to a core network device in the system, sending the application request to the first application server comprises:
    sending the application request to the first application server according to an offload policy,
    sending the application request to the core network device according to the offload policy, and
    receiving a negative notification sent by the first application server, wherein the negative notification is used for notifying the first access network device that the application server is not capable of processing the application service corresponding to the application request;
  receiving an application response and guarantee information that is determined according to the application response and a network environment, that are sent by the first application server, wherein the guarantee information is used for instructing the first access network device to guarantee sending of the application response; and
  sending the application response to the user equipment according to the guarantee information;
  wherein when sending of the application response is completed, a network state is restored.

4. A method for providing an application service, wherein the method is configured for execution by a core network device in a system for providing the application service, the method comprising:
  receiving an application request from a first access network device in the system, wherein the application request is corresponding to the application service, wherein the core network device is further connected to the first access network device;
  sending the application request to a service provider, so that the service provider determines an application response according to the application request, wherein the application response is corresponding to the application service;
  receiving the application response sent by the service provider, and sending the application response to the first access network device, wherein the first access network device is configured to receive guarantee information that is determined according to the application response and a network environment, wherein the guarantee information is used for instructing the first access network device to guarantee sending of the application response;
  sending the application response to user equipment according to the guarantee information;
  wherein when sending of the application response is completed, a network state is restored;

wherein the first access network device sends the application request to the core network device according to an offload policy; and
  receiving a negative notification sent by the service provider, wherein the negative notification is used for notifying the first access network device that the service provider is not capable of processing an application service corresponding to the application request.

5. A method for charging or interception when an application service is provided, wherein the method is configured for execution by a first application server in a system for providing the application service, wherein the first application server is connected to a first access network device in the system, the method comprising:
  receiving an application request sent by the first access network device, wherein the application request is received by the first access network device from a user equipment, and the application request is corresponding to the application service;
  triggering a charging or interception process;
  before the application request sent by the user equipment is received, receiving a charging or interception notification sent by a core network device, wherein the charging or interception notification is used for indicating a charging or interception rule;
  wherein the charging or interception process comprises:
    when the application request is received, performing charging, and in a case in which an application response is sent to the user equipment, sending charging information to the core network device, for notifying the core network device of a charging result;
    when the charging information is sent to the core network device, determining, according to the charging or interception notification, whether to perform charging or interception; and
    when it is determined to perform interception, sending a copy of the application request and a copy of the application response to the core network device, to instruct the core network device to start performing interception;
  determining a guarantee message according to the application response and a network environment, wherein the guarantee message is used for instructing the first access network device to guarantee sending of the application response;
  when the application response is sent to the first access network device, sending the guarantee message to the first access network device, so that the first access network device sends the application response to the user equipment according to the guarantee message; and
  when sending of the application response is completed, restoring a network state.

6. The method according to claim 5, wherein:
triggering a charging or interception process comprises:
  sending a copy of the application request to a core network device, to instruct the core network device to start performing charging or interception; and
  when an application response is sent to the user equipment, sending a copy of the application response to the core network device, to instruct the core network device to perform charging or interception, wherein the application response is corresponding to the application service.

7. The method according to claim 5, wherein the charging or interception process comprises:

when the application request sent by the user equipment is received, determining, according to the charging or interception notification, whether to perform charging or interception; and when it is determined to perform interception, skipping processing the application service corresponding to the application request, and sending the application request to the core network device, to instruct the core network device to start performing charging or interception; or when it is determined not to perform interception, processing the application service corresponding to the application request, and performing charging, and in a case in which an application response is sent to the user equipment, sending charging information to the core network device, for notifying the core network device of a charging result.

* * * * *